(12) United States Patent
Zhang et al.

(10) Patent No.: US 12,041,487 B2
(45) Date of Patent: Jul. 16, 2024

(54) USER EQUIPMENT BASED PACKET DATA CONVERGENCE PROTOCOL (PDCP) DUPLICATION ACTIVATION AND DEACTIVATION

(71) Applicant: Apple Inc., Cupertino, CA (US)

(72) Inventors: Yujian Zhang, Cupertino, CA (US); Junaid Ansari, Cupertino, CA (US); Marta Martinez Tarradell, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 282 days.

(21) Appl. No.: 17/438,656

(22) PCT Filed: Apr. 30, 2020

(86) PCT No.: PCT/US2020/030807
§ 371 (c)(1),
(2) Date: Sep. 13, 2021

(87) PCT Pub. No.: WO2020/223531
PCT Pub. Date: Nov. 5, 2020

(65) Prior Publication Data
US 2022/0159514 A1 May 19, 2022

Related U.S. Application Data

(60) Provisional application No. 62/841,758, filed on May 1, 2019.

(51) Int. Cl.
*H04W 28/02* (2009.01)
*H04W 24/08* (2009.01)
(Continued)

(52) U.S. Cl.
CPC ........... *H04W 28/12* (2013.01); *H04W 24/08* (2013.01)

(58) Field of Classification Search
None
See application file for complete search history.

(56) References Cited

U.S. PATENT DOCUMENTS

| 10,820,224 | B2* | 10/2020 | Lee | ............... H04W 72/21 |
| 2018/0324642 | A1* | 11/2018 | Yu | ............... H04L 5/0053 |

(Continued)

FOREIGN PATENT DOCUMENTS

| CN | 107637121 | 1/2018 |
| CN | 108810968 | 11/2018 |

(Continued)

OTHER PUBLICATIONS

[No Author Listed, "5G; NR; Medium Access Control (MAC) protocol specification (3GPP TS 38.321 version 15.3.0 Release 15)," ETSI TS 38.321, V 15.3.0, Sep. 2018, 77 pages.

(Continued)

*Primary Examiner* — Sai Aung
(74) *Attorney, Agent, or Firm* — Fish & Richardson P.C.

(57) ABSTRACT

A process for execution by user equipment (UE) for activation or deactivation of a Radio Link Control (RLC) entity for Packet Data Convergence Protocol (PDCP) duplication includes identifying a set of RLC entities that are configured by a Radio Resource Control (RRC) for communication using PDCP. The process includes, for each RLC entity of the set of RLC entities: determining a network configured offset value; determining a channel condition value; and determining an RLC entity level value based on a combination of the network configured offset value and the channel condition value. The process includes comparing the RLC entity level value for each RLC entity to a threshold value; and based on comparing the RLC entity level value to the threshold value, selecting a subset of RLC entities for (Continued)

PDCP duplication; and activating or deactivating PDCP duplication for the selected subset of RLC entities.

19 Claims, 9 Drawing Sheets

(51) Int. Cl.
*H04W 28/12* (2009.01)
*H04W 36/00* (2009.01)

(56) References Cited

U.S. PATENT DOCUMENTS

| | | | | |
|---|---|---|---|---|
| 2019/0124677 | A1* | 4/2019 | Kim | H04W 72/12 |
| 2020/0016221 | A1* | 1/2020 | Furuichi | A61K 35/747 |
| 2020/0281022 | A1* | 9/2020 | Pelletier | H04W 52/367 |
| 2020/0305186 | A1* | 9/2020 | Alfarhan | H04W 72/0453 |
| 2023/0345457 | A1* | 10/2023 | Kim | H04W 72/1263 |

FOREIGN PATENT DOCUMENTS

| | | |
|---|---|---|
| WO | WO 2018/005406 | 1/2018 |
| WO | WO 2018/203736 | 11/2018 |

OTHER PUBLICATIONS

[No Author Listed], "3rd Generation Partnership Project; Technical Specification Group Radio Access Network; Study on NR Industrial Internet of Things (IoT); (Release 16)," 3GPP TR 38.825 V 16.0.0, Mar. 2019, 32 pages.

[No Author Listed], "5G; NR; Physical Layer Measurements (3GPP TS 38.215 version 15.4.0 Release 15)," ETSI TS 38.215, V 15.4.0, Apr. 2019, 18 pages.

[No Author Listed], "5G; NR; Physical layer procedures for control (3GPP TS 38.213 version 15.4.0 Release 15)," ETSI TS 38.213 V 15.4.0, Apr. 2019, 106 pages.

International Preliminary Report on Patentability in International Appln. No. PCT/US2020/030807, dated Nov. 11, 2021, 8 pages.

International Search Report and Written Opinion in International Appln. No. PCT/US2020/030807, Aug. 3, 2020, 15 pages.

Samsung, "Impact of Deactivation of PDCP Duplication to RLC," 3GPP TSG-RAN WG2 Meeting #101, R2-1803590, Athens, Greece, Feb. 26-Mar. 2, 2018, 3 pages.

TCL, "Interaction between PDCP and RLC Entities for duplication in NR-NR DC," 3GPP TSG-RAN2#101bis, R2-1804294, Sanya, China, Apr. 16-20, 2018, 4 pages.

* cited by examiner

USER EQUIPMENT BASED PACKET DATA CONVERGENCE PROTOCOL (PDCP) DUPLICATION ACTIVATION AND DEACTIVATION

CROSS-REFERENCE TO RELATED APPLICATION

This application claims priority to U.S. Provisional Patent Application No. 62/841,758, titled, filed May 1, 2019, the entire content of which is incorporated herein by reference.

TECHNICAL FIELD

This disclosure relates generally to configuring communications between radio link control entities and user equipment.

BACKGROUND

Wireless communication systems are rapidly growing in usage. Further, wireless communication technology has evolved from voice-only communications to also include the transmission of data, such as Internet and multimedia content, to a variety of devices. To accommodate a growing number of devices communicating both voice and data signals, many wireless communication systems share the available communication channel resources among devices.

SUMMARY

The fifth generation of mobile technology (5G) is configured to enable a fully mobile and connected society and to empower socio-economic transformations in countless ways many of which are unimagined today, including those for productivity, sustainability and well-being. This disclosure describes a unified user equipment (UE) based approach to select a subset of radio link control (RLC) entities for Packet Data Convergence Protocol (PDCP) duplication. Generally, the UE-based systems and methods described in this disclosure enable, by a UE, autonomous selection of RLC entities for PDCP duplication in response to the change of radio conditions. Generally, a UE is configured to select a subset of configured RLC entities (e.g., configured by a radio resource control (RRC) entity) used for PDCP duplication. In some implementations, of the UE-based approach for PDCP duplication activation and/or deactivation; network-configured triggering criteria are used by the UE to autonomously select a subset of RLC entities for PDCP duplication The systems methods described herein can include one or more advantages. The systems and methods described in this disclosure may reduce signaling and resource overhead from UE and/or network perspectives. The UE-based systems and methods described in this disclosure may facilitate quality of signal (QoS) requirements for Ultra-Reliable and Low Latency (URLLC) services.

In a general aspect, a process for execution by user equipment (UE) for activation or deactivation of a Radio Link Control (RLC) entity for Packet Data Convergence Protocol (PDCP) duplication includes identifying a set of RLC entities that are configured by a Radio Resource Control (RRC) for communication using PDCP. The process includes, for each RLC entity of the set of RLC entities, determining a channel condition value and determining an RLC entity level value based on a combination of an offset value and the channel condition value. The process includes comparing the respective RLC entity level values for each RLC entity to a threshold value. The process includes, based on comparing the respective RLC entity level values to the threshold value, selecting a subset of the set of RLC entities for PDCP duplication; and activating or deactivating the PDCP duplication by the selected subset of RLC entities.

In some implementations, the process includes causing a duplicated transmission using the subset of RLC entities that are selected. In some implementations, determining the channel condition value comprises measuring one or more values selected from: a pathloss value, a synchronization signal/channel-state information reference signal (SS/CSI-RS) value, a reference signal received power (RSRP) value, a reference signal received quality (RSRQ) value, a signal to noise and interference ratio SINK value, and a power headroom value. In some implementations, determining the channel condition value comprises averaging cell-level measurements associated with the RLC entity.

In some implementations, each RLC entity includes a set of cells. In some implementations, determining the RLC entity level value for the RLC entity includes determining, for each cell of the set of cells for the RLC entity, a cell level channel condition value and a cell level offset value. The process includes selecting one or more cells from the set of cells. The process includes determining the RLC entity level value as a function of the cell level channel condition value and the cell level offset value for each cell of the one or more cells. The cell level offset value is the offset value.

In some implementations, selecting one or more cells from the set of cells includes selecting the cell including a cell level channel condition value representing a lowest pathloss value relative to pathloss values associated with other cells of the set of cells. In some implementations, determining the RLC entity level value as a function of the cell level channel condition value and the cell level offset value for each cell of the one or more cells comprises averaging the cell level channel condition value and the cell level offset value for the one or more cells.

In some implementations, the process includes determining that at least one RLC entity of the set of RLC entities is associated with an RLC entity level value satisfies the threshold value, where selecting the subset of RLC entities for PDCP duplication comprises selecting a particular RLC entity associated with a smallest RLC entity level value relative to other RLC entity level values of the set of RLC entities or associated with a largest RLC entity level value relative to the other RLC entity level values of the set of RLC entities.

In some implementations, the threshold value is a first threshold value. The process includes, based on comparing the RLC entity level value for each RLC entity to the first threshold value, determining that none of the RLC entities are associated with RLC entity value that satisfies the first threshold value; comparing the RLC entity level value for each RLC entity to a second threshold value; and determining that at least two RLC entities are associated with respective RLC entity values that satisfy the second threshold value. In some implementations, selecting the subset of RLC entities for PDCP duplication includes selecting two RLC entities associated with smallest respective RLC entity values relative to other RLC entity level values of the set of RLC entities or selecting two RLC entities associated with largest respective RLC entity values relative to the other RLC entity level values of the set of RLC entities.

In some implementations, the process includes receiving a medium access control (MAC) control element (CE) indicating a selection of a particular subset of RLC entities for PDCP duplication; initiating a timer having a duration; and pausing selection of the subset of RLC entities for PDCP duplication until the duration expires. In some implementations, the duration of the timer is specific to the UE, specific to a MAC entity that generates the MAC CE, or specific to a data radio bearer (DRB) associated with the MAC entity.

In a general aspect, a UE includes at least one processing device; and a memory storing instructions that, when executed by the at least one processing device, causing the at least one processing device to perform operations including identifying a set of RLC entities that are configured by a Radio Resource Control (RRC) for communication using PDCP. The operations include, for each RLC entity of the set of RLC entities, determining a channel condition value, and determining an RLC entity level value based on a combination of an offset value and the channel condition value. The operations include comparing the RLC respective entity level values for each RLC entity to a threshold value. The operations include, based on comparing the respective RLC entity level values to the threshold value, selecting a subset of the set of RLC entities for PDCP duplication activating or deactivating the PDCP duplication by the selected subset of RLC entities.

In some implementations, the operations further comprise causing a duplicated transmission using the subset of RLC entities that are selected. In some implementations, determining the channel condition value comprises measuring one or more values selected from: a pathloss value, a synchronization signal/channel-state information reference signal (SS/CSI-RS) value, a reference signal received power (RSRP) value, a reference signal received quality (RSRQ) value, a signal to noise and interference ratio SINR value, and a power headroom value.

In some implementations, determining the channel condition value comprises averaging cell-level measurements for the RLC entity. In some implementations, each RLC entity includes a set of cells, and where determining the RLC entity level value for the RLC entity includes determining, for each cell of the set of cells for the RLC entity, a cell level channel condition value and a cell level offset value, selecting one or more cells from the set of cells, and determining the RLC entity level value as a function of the cell level channel condition value and the cell level offset value for each cell of the one or more cells, where the cell level offset value is the offset value.

In some implementations, determining the RLC entity level value as a function of the cell level channel condition value and the cell level offset value for each cell of the one or more cells comprises averaging the cell level channel condition value and the cell level offset value for the one or more cells.

In some implementations, the operations further comprise determining that at least one RLC entity of the set of RLC entities is associated with an RLC entity level value satisfies the threshold value. In some implementations, selecting the subset of RLC entities for PDCP duplication comprises selecting a particular RLC entity associated with a smallest RLC entity level value relative to other RLC entity level values of the set of RLC entities or associated with a largest RLC entity level value relative to the other RLC entity level values of the set of RLC entities.

In some implementations, the operations include receiving a medium access control (MAC) control element (CE) indicating a selection of a particular subset of RLC entities for PDCP duplication. In some implementations, the operations include initiating a timer having a duration; and pausing selection of the subset of RLC entities for PDCP duplication until the duration expires. In some implementations, the duration of the timer is specific to the UE, specific to a MAC entity that generates the MAC CE, or specific to a data radio bearer (DRB) associated with the MAC entity.

The details of one or more implementations are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

The fifth generation of mobile technology (5G) is configured to enable a fully mobile and connected society and to empower socio-economic transformations in countless ways many of which are unimagined today, including those for productivity, sustainability and well-being. This disclosure describes a unified user equipment (UE) based approach to select a subset of radio link control (RLC) entities for Packet Data Convergence Protocol (PDCP) duplication. Generally, the UE-based systems and methods described in this disclosure enable, by a UE, autonomous selection of RLC entities for PDCP duplication in response to the change of radio conditions. The systems and methods described in this disclosure enable a UE to reduce signaling and resource overhead. The UE-based systems and methods described in this disclosure can guarantee quality of signal (QoS) requirements for Ultra-Reliable and Low Latency (URLLC) services.

Generally, a UE is configured to select a subset of configured RLC entities (e.g., configured by a radio resource control (RRC) entity) used for PDCP duplication. In some implementations, of the UE-based approach for PDCP duplication activation and/or deactivation, network-configured triggering criteria are used by the UE to autonomously select a subset of RLC entities for PDCP duplication.

Figure 1:
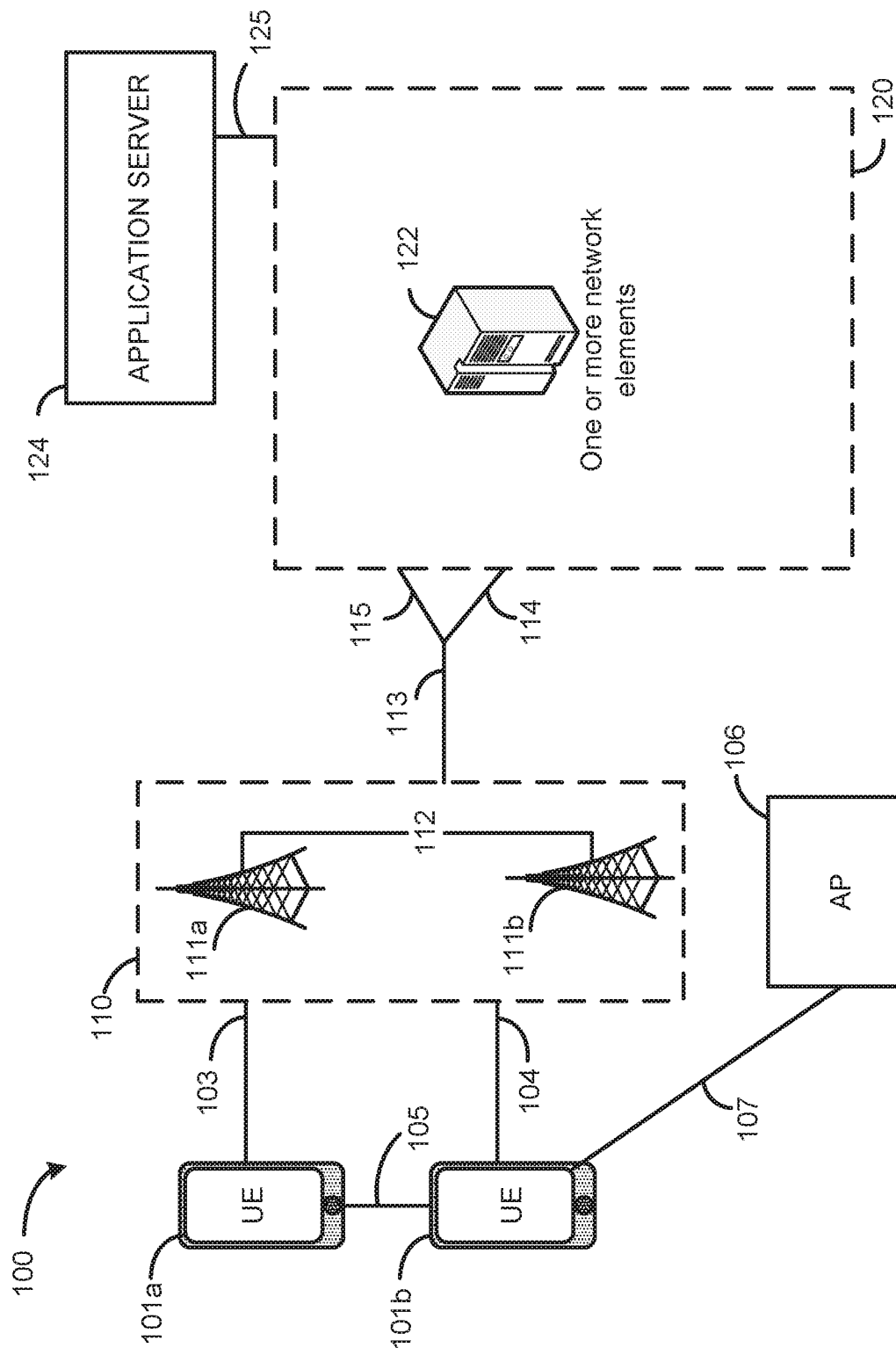
FIG. 1 illustrates an example wireless communication system.

FIG. 1 illustrates an example wireless communication system 100. For purposes of convenience and without limitation, the example system 100 is described in the context of the LTE and 5G NR communication standards as defined by the Third Generation Partnership Project (3GPP) technical specifications. However, the technology described herein may be implemented in other communication systems using other communication standards, such as other 3GPP standards or IEEE 802.16 protocols (e.g., WMAN or WiMAX), among others.

The system 100 includes UE 101*a* and UE 101*b* (collectively referred to as the "UEs 101"). In this example, the UEs 101 are illustrated as smartphones (e.g., handheld touchscreen mobile computing devices connectable to one or more cellular networks). In other examples, any of the UEs 101 may include other mobile or non-mobile computing devices, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, or combinations of them, among others.

In some examples, any of the UEs 101 may be IoT UEs, which can include a network access layer designed for low-power IoT applications utilizing short-lived UE connections. An IoT UE can utilize technologies such as M2M or MTC for exchanging data with an MTC server or device using, for example, a public land mobile network (PLMN), proximity services (ProSe), device-to-device (D2D) communication, sensor networks, IoT networks, or combinations of them, among others. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages or status updates) to facilitate the connections of the IoT network.

The UEs 101 are configured to connect (e.g., communicatively couple) with an access network (AN) or radio access network (RAN) 110. In some examples, the RAN 110 may be a next generation RAN (NG RAN), an evolved UMTS terrestrial radio access network (E-UTRAN), or a legacy RAN, such as a UMTS terrestrial radio access network (UTRAN) or a GSM EDGE radio access network (GERAN). As used herein, the term "NG RAN" may refer to a RAN 110 that operates in a 5G NR system 100, and the term "E-UTRAN" may refer to a RAN 110 that operates in an LTE or 4G system 100.

To connect to the RAN 110, the UEs 101 utilize connections (or channels) 103 and 104, respectively, each of which may include a physical communications interface or layer, as described below. In this example, the connections 103 and 104 are illustrated as an air interface to enable communicative coupling, and can be consistent with cellular communications protocols, such as a global system for mobile communications (GSM) protocol, a code-division multiple access (CDMA) network protocol, a push-to-talk (PTT) protocol, a PTT over cellular (POC) protocol, a universal mobile telecommunications system (UMTS) protocol, a 3GPP LTE protocol, a 5G NR protocol, or combinations of them, among other communication protocols. In some examples, the UEs 101 may directly exchange communication data using an interface 105, such as a ProSe interface. The interface 105 may alternatively be referred to as a sidelink interface 105 and may include one or more logical channels, such as a physical sidelink control channel (PSCCH), a physical sidelink shared channel (PSSCH), a physical sidelink downlink channel (PSDCH), or a physical sidelink broadcast channel (PSBCH), or combinations of them, among others.

The UE 101*b* is shown to be configured to access an access point (AP) 106 (also referred to as "WLAN node 106," "WLAN 106," "WLAN Termination 106," "WT 106" or the like) using a connection 107. The connection 107 can include a local wireless connection, such as a connection consistent with any IEEE 802.11 protocol, in which the AP 106 would include a wireless fidelity (Wi-Fi®) router. In this example, the AP 106 is shown to be connected to the Internet without connecting to the core network of the wireless system, as described in further detail below. In various examples, the UE 101*b*, RAN 110, and AP 106 may be configured to use LTE-WLAN aggregation (LWA) operation or LTW/WLAN radio level integration with IPsec tunnel (LWIP) operation. The LWA operation may involve the UE 101*b* in RRC_CONNECTED being configured by a RAN node 111*a*, 111*b* to utilize radio resources of LTE and WLAN. LWIP operation may involve the UE 101*b* using WLAN radio resources (e.g., connection 107) using IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111*a* and 111*b* (collectively referred to as "RAN nodes 111" or "RAN node 111") that enable the connections 103 and 104. As used herein, the terms "access node," "access point," or the like may describe equipment that provides the radio baseband functions for data or voice connectivity, or both, between a network and one or more users. These access nodes can be referred to as base stations (BS), gNodeBs, gNBs, eNodeBs, eNBs, NodeBs, RAN nodes, rode side units (RSUs), transmission reception points (TRxPs or TRPs), and the link, and can include ground stations (e.g., terrestrial access points) or satellite stations providing coverage within a geographic area (e.g., a cell), among others. As used herein, the term "NG RAN node" may refer to a RAN node 111 that operates in an 5G NR system 100 (for example, a gNB), and the term "E-UTRAN node" may refer to a RAN node 111 that operates in an LTE or 4G system 100 (e.g., an eNB). In some examples, the RAN nodes 111 may be implemented as one or more of a dedicated physical device such as a macrocell base station, or a low power (LP) base station for providing femtocells, picocells or other like cells having smaller coverage areas, smaller user capacity, or higher bandwidth compared to macrocells.

In some examples, some or all of the RAN nodes 111 may be implemented as one or more software entities running on server computers as part of a virtual network, which may be referred to as a cloud RAN (CRAN) or a virtual baseband unit pool (vBBUP). The CRAN or vBBUP may implement a RAN function split, such as a packet data convergence protocol (PDCP) split in which radio resource control (RRC) and PDCP layers are operated by the CRAN/vBBUP and other layer two (e.g., data link layer) protocol entities are operated by individual RAN nodes 111; a medium access control (MAC)/physical layer (PHY) split in which RRC, PDCP, MAC, and radio link control (RLC) layers are operated by the CRAN/vBBUP and the PHY layer is operated by individual RAN nodes 111; or a "lower PHY" split in which RRC, PDCP, RLC, and MAC layers and upper portions of the PRY layer are operated by the CRAN/vBBUP and lower portions of the PHY layer are operated by individual RAN nodes 111. This virtualized framework allows the freed-up processor cores of the RAN nodes 111 to perform, for example, other virtualized applications. In some examples, an individual RAN node 111 may represent individual gNB distributed units (DUs) that are connected to a gNB central unit (CU) using individual F1 interfaces (not shown in FIG. 1). In some examples, the gNB-DUs may include one or more remote radio heads or RFEMs (see, e.g., FIG. 2), and the gNB-CU may be operated by a server that is located in the RAN 110 (not shown) or by a server pool in a similar manner as the CRAN/vBBUP). Additionally or alternatively, one or more of the RAN nodes 111 may be next generation eNBs (ng-eNBs), including RAN nodes that provide E-UTRA user plane and control plane protocol terminations toward the UEs 101, and are connected to a 5G core network (e.g., core network 120) using a next generation interface.

In vehicle-to-everything (V2X) scenarios, one or more of the RAN nodes 111 may be or act as RSUs. The term "Road Side Unit" or "RSU" refers to any transportation infrastructure entity used for V2X communications. A RSU may be implemented in or by a suitable RAN node or a stationary (or relatively stationary) UE, where a RSU implemented in or by a UE may be referred to as a "UE-type RSU," a RSU implemented in or by an eNB may be referred to as an "eNB-type RSU," a RSU implemented in or by a gNB may be referred to as a "gNB-type RSU," and the like. In some examples, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications or other software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) or provide connectivity to one or more cellular networks to provide uplink and downlink communications, or both. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller or a backhaul network, or both.

Any of the RAN nodes 111 can terminate the air interface protocol and can be the first point of contact for the UEs 101. In some examples, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some examples, the UEs 101 can be configured to communicate using orthogonal frequency division multiplexing (OFDM) communication signals with each other or with any of the RAN nodes 111 over a multicarrier communication channel in accordance with various communication techniques, such as, but not limited to, OFDMA communication techniques (e.g., for downlink communications) or SC-FDMA communication techniques (e.g., for uplink and ProSe or sidelink communications), although the scope of the techniques described here not limited in this respect. The OFDM signals can comprise a plurality of orthogonal subcarriers.

In some examples, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

In some examples, the UEs 101 and the RAN nodes 111 communicate (e.g., transmit and receive) data over a licensed medium (also referred to as the "licensed spectrum" or the "licensed band") and an unlicensed shared medium (also referred to as the "unlicensed spectrum" or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 101 and the RAN nodes 111 may operate using license assisted access (LAA), enhanced-LAA (eLAA), or further enhanced-LAA (feLAA) mechanisms. In these implementations, the UEs 101 and the RAN nodes 111 may perform one or more known medium-sensing operations or carrier-sensing operations, or both, to determine whether one or more channels in the unlicensed spectrum are unavailable or otherwise occupied prior to transmitting in the unlicensed spectrum. The medium/carrier sensing operations may be performed according to a listen-before-talk (LBT) protocol. LBT is a mechanism in which equipment (for example, UEs 101, RAN nodes 111) senses a medium (for example, a channel or carrier frequency) and transmits when the medium is sensed to be idle (or when a specific channel in the medium is sensed to be unoccupied). The medium sensing operation may include clear channel assessment (CCA), which uses energy detection to determine the presence or absence of other signals on a channel in order to determine if a channel is occupied or clear. This LBT mechanism allows cellular/LAA networks to coexist with incumbent systems in the unlicensed spectrum and with other LAA networks. Energy detection may include sensing RF energy across an intended transmission band for a period of time and comparing the sensed RF energy to a predefined or configured threshold.

The incumbent systems in the 5 GHz band can be WLANs based on IEEE 802.11 technologies. WLAN employs a contention-based channel access mechanism (e.g., CSMA with collision avoidance (CSMA/CA)). In some examples, when a WLAN node (e.g., a mobile station (MS), such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the contention window size (CWS), which is increased exponentially upon the occurrence of collision and reset to a minimum value as the transmission succeeds. In some examples, the LBT mechanism designed for LAA is similar to the CSMA/CA of WLAN. In some examples, the LBT procedure for DL or UL transmission bursts, including PDSCH or PUSCH transmissions, respectively, may have an LAA contention window that is variable in length between X and Y extended CAA (SCCA) slots, where X and Y are minimum and maximum values for the CWSs for LAA. In one example, the minimum CWS for an LAA transmission may be 9 microseconds ($\mu s$); however, the size of the CWS and a maximum channel occupancy time (for example, a transmission burst) may be based on governmental regulatory requirements.

In some examples, the LAA mechanisms are built on carrier aggregation technologies of LTE-Advanced systems. In CA, each aggregated carrier is referred to as a component carrier. In some examples, a component carrier may have a bandwidth of 1.4, 3, 5, 10, 15 or 20 MHz, and a maximum of five component carriers can be aggregated to provide a maximum aggregated bandwidth is 100 MHz. In frequency division duplex (FDD) systems, the number of aggregated carriers can be different for DL and UL. For example, the number of UL component carriers can be equal to or lower than the number of DL component carriers. In some cases, individual component carriers can have a different bandwidth than other component carriers. In time division duplex (TDD) systems, the number of component carriers as well as the bandwidths of each component carrier is usually the same for DL and UL.

Carrier aggregation can also include individual serving cells to provide individual component carriers. The coverage of the serving cells may differ, for example, because component carriers on different frequency bands may experience different path loss. A primary service cell (PCell) may provide a primary component carrier for both UL and DL, and may handle RRC and non-access stratum (NAS) related activities. The other serving cells are referred to as secondary component carriers (SCells), and each SCell may provide an individual secondary component carrier for both UL and DL. The secondary component carriers may be added and removed as required, while changing the primary component carrier may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 101. The PDCCH carries information about the transport format and resource allocations related to the PDSCH channel, among other things. It may also inform the UEs 101 about the transport format, resource allocation, and hybrid automatic repeat request (HARQ) information related to the uplink shared channel. Downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses control channel elements (CCEs) to convey the control information. Before being mapped to resource elements, the PDCCH complex-valued symbols may first be organized into quadruplets, which may then be permuted using a sub-block interleaver for rate matching. In some examples, each PDCCH may be transmitted using one or more of these CCEs, in which each CCE may correspond to nine sets of four physical resource elements collectively referred to as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. In LTE, there can be four or more different PDCCH formats defined with different numbers of CCEs (e.g., aggregation level, L=1, 2, 4, or 8).

Some implementations may use concepts for resource allocation for control channel information that are an extension of the above-described concepts. For example, some implementations may utilize an enhanced PDCCH (EPDCCH) that uses PDSCH resources for control information transmission. The EPDCCH may be transmitted using one or more enhanced CCEs (ECCEs). Similar to above, each ECCE may correspond to nine sets of four physical resource elements collectively referred to as an enhanced REG (EREG). An ECCE may have other numbers of EREGs in some examples.

The RAN nodes 111 are configured to communicate with one another using an interface 112. In examples, such as where the system 100 is an LTE system (e.g., when the core network 120 is an evolved packet core (EPC) network), the interface 112 may be an X2 interface 112. The X2 interface may be defined between two or more RAN nodes 111 (e.g., two or more eNBs and the like) that connect to the EPC 120, or between two eNBs connecting to EPC 120, or both. In some examples, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB to a secondary eNB; information about successful in sequence delivery of PDCP protocol data units (PDUs) to a UE 101 from a secondary eNB for user data; information of PDCP PDUs that were not delivered to a UE 101; information about a current minimum desired buffer size at the secondary eNB for transmitting to the UE user data, among other information. The X2-C may provide intra-LTE access mobility functionality, including context transfers from source to target eNBs or user plane transport control; load management functionality; inter-cell interference coordination functionality, among other functionality.

Figure 3:
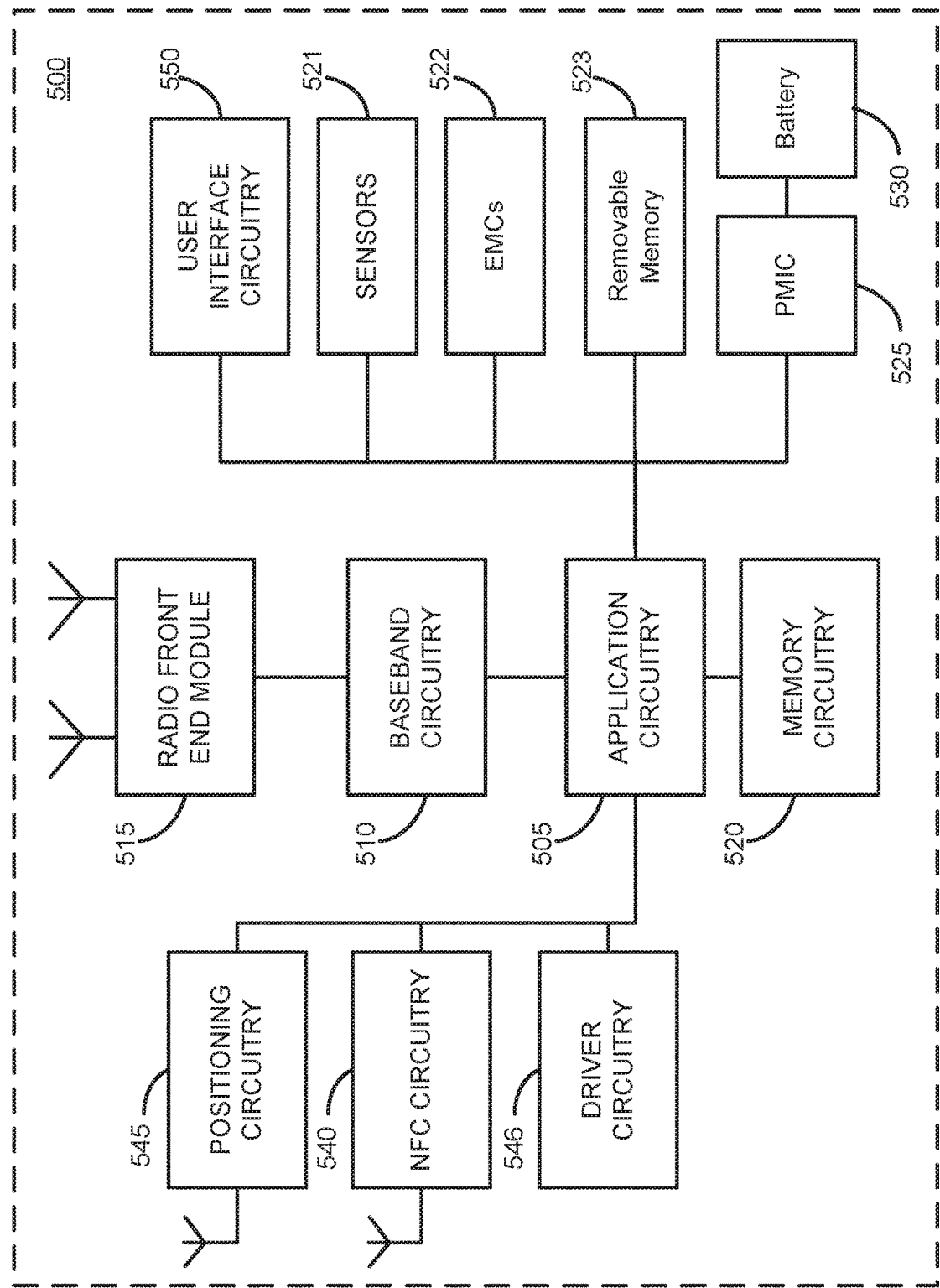
FIG. 3 illustrates an example of a platform or device.

In some examples, such as where the system 100 is a 5G NR system (e.g., when the core network 120 is a 5G core network as shown in FIG. 3), the interface 112 may be an Xn interface 112. The Xn interface may be defined between two or more RAN nodes 111 (e.g., two or more gNBs and the like) that connect to the 5G core network 120, between a RAN node 111 (e.g., a gNB) connecting to the 5G core network 120 and an eNB, or between two eNBs connecting to the 5G core network 120, or combinations of them. In some examples, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111, among other functionality. The mobility support may include context transfer from an old (source) serving RAN node 111 to new (target) serving RAN node 111, and control of user plane tunnels between old (source) serving RAN node 111 to new (target) serving RAN node 111. A protocol stack of the Xn-U may include a transport network layer built on Internet Protocol (IP) transport, layer, and a GPRS tunneling protocol for user plane (GTP-U) layer on top of a user datagram protocol (UDP) or IP layer(s), or both, to carry user plane PDUs. The Xn-C protocol stack may include an application layer signaling protocol (referred to as Xn Application Protocol (Xn-AP)) and a transport network layer that is built on a stream control transmission protocol (SCTP). The SCTP may be on top of an IP layer, and may provide the guaranteed delivery of application layer messages. In the transport IP layer, point-to-point transmission is used to deliver the signaling PDUs. In other implementations, the Xn-U protocol stack or the Xn-C protocol stack, or both, may be same or similar to the user plane and/or control plane protocol stack(s) shown and described herein.

The RAN 110 is shown to be communicatively coupled to a core network 120 (referred to as a "CN 120"). The CN 120 includes one or more network elements 122, which are configured to offer various data and telecommunications services to customers/subscribers (e.g., users of UEs 101) who are connected to the CN 120 using the RAN 110. The components of the CN 120 may be implemented in one physical node or separate physical nodes and may include components to read and execute instructions from a machine-readable or computer-readable medium (e.g., a non-transitory machine-readable storage medium). In some examples, network functions virtualization (NFV) may be used to virtualize some or all of the network node functions described here using executable instructions stored in one or more computer-readable storage mediums, as described in further detail below. A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more network components or functions, or both.

Generally, an application server 130 may be an element offering applications that use IP bearer resources with the core network (e.g., UMTS packet services (PS) domain, LTE PS data services, among others). The application server 130 can also be configured to support one or more communication services (e.g., VoIP sessions, PTT sessions, group communication sessions, social networking services, among others) for the UEs 101 using the CN 120.

In some examples, the CN 120 may be a 5G core network (referred to as "5GC 120"), and the RAN 110 may be connected with the CN 120 using a next generation interface 113. In some examples, the next generation interface 113 may be split into two parts, an next generation user plane (NG-U) interface 114, which carries traffic data between the RAN nodes 111 and a user plane function (UPF), and the S1 control plane (NG-C) interface 115, which is a signaling interface between the RAN nodes 111 and access and mobility management functions (AMFs). Examples where the CN 120 is a 5GC 120 are discussed in more detail with regard to FIG. 3.

In some examples, the CN 120 may be an EPC (referred to as "EPC 120" or the like), and the RAN 110 may be connected with the CN 120 using an S1 interface 113. In some examples, the S1 interface 113 may be split into two parts, an S1 user plane (S1-U) interface 114, which carries traffic data between the RAN nodes 111 and the serving gateway (S-GW), and the S1-MME interface 115, which is a signaling interface between the RAN nodes 111 and mobility management entities (MMEs).

Figure 2:
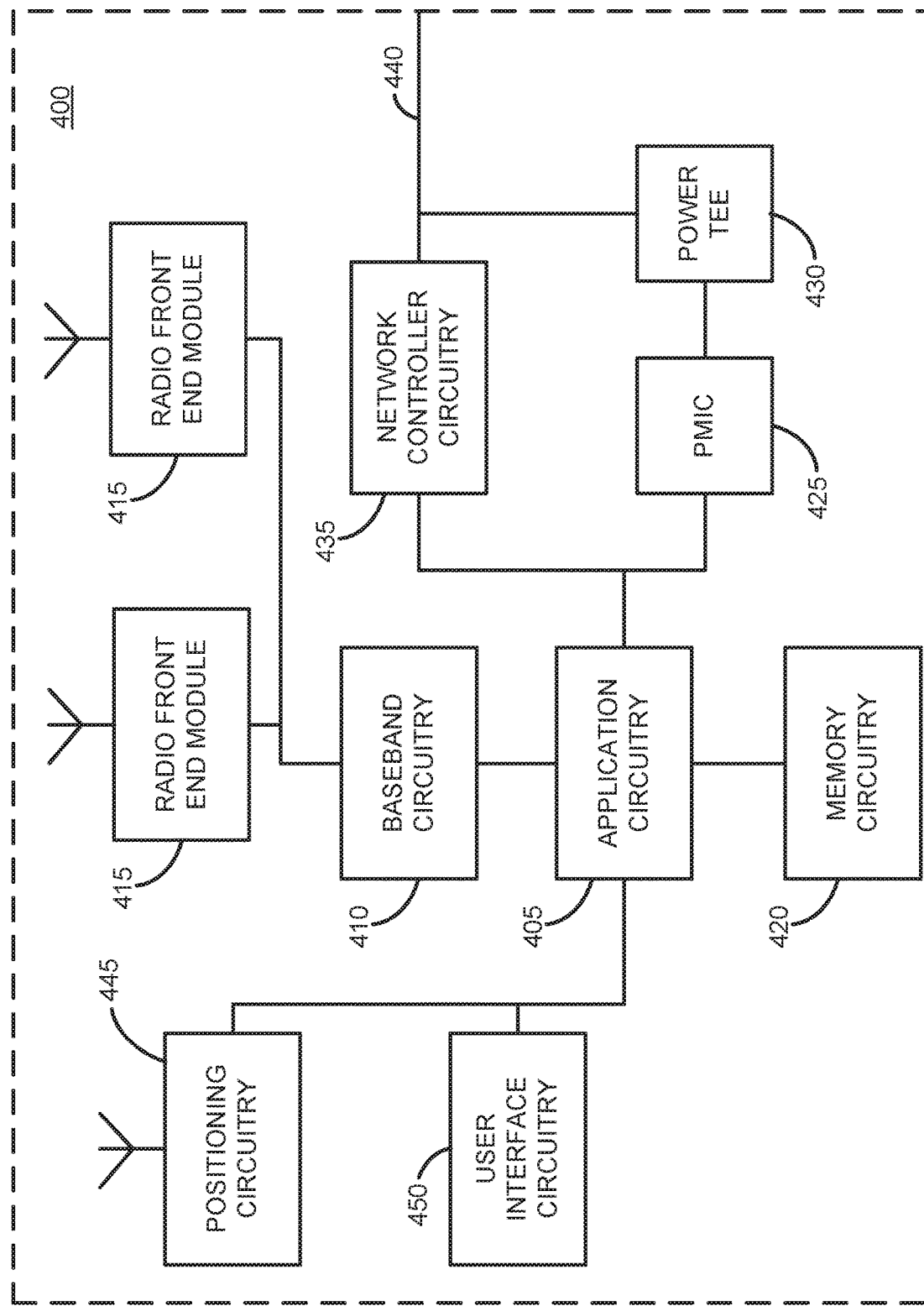
FIG. 2 illustrates an example of infrastructure equipment.

FIG. 2 illustrates an example of infrastructure equipment 400. The infrastructure equipment 400 (or "system 400") may be implemented as a base station, a radio head, a RAN node, such as the RAN nodes 111 or AP 106 shown and described previously, an application server(s) 130, or any other component or device described herein. In other examples, the system 400 can be implemented in or by a UE.

The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface circuitry 450. In some examples, the system 400 may include additional elements such as, for example, memory, storage, a display, a camera, one or more sensors, or an input/output (I/O) interface, or combinations of them, among others. In other examples, the components described with reference to the system 400 may be included in more than one device. For example, the various circuitries may be separately included in more than one device for CRAN, vBBU, or other implementations.

The application circuitry 405 includes circuitry such as, but not limited to, one or more processors (or processor cores), cache memory, one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile industry Processor Interface (MIPI) interfaces and Joint Test Access Group (JTAG) test access ports. The processors (or cores) of the application circuitry 405 may be coupled with or may include memory or storage elements and may be configured to execute instructions stored in the memory or storage to enable various applications or operating systems to run on the system 400. In some examples, the memory or storage elements may include on-chip memory circuitry, which may include any suitable volatile or non-volatile memory, such as DRAM, SRAM, EPROM, EEPROM, Flash memory, solid-state memory, or combinations of them, among other types of memory.

The processor(s) of the application circuitry 405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or combinations of them, among others. In some examples, the application circuitry 405 may include, or may be, a special-purpose processor or controller configured to carry out the various techniques described here. As examples, the processor(s) of application circuitry 405 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some examples, the system. 400 may not utilize application circuitry 405, and instead may include a special-purpose processor or controller to process IP data received from an EPC or 5GC, for example.

In some examples, the application circuitry 405 may include one or more hardware accelerators, which may be microprocessors, programmable processing devices, or the like. The one or more hardware accelerators may include, for example, computer vision (CV) or deep learning (DL) accelerators, or both. In some examples, the programmable processing devices may be one or more a field-programmable devices (FPDs) such as field-programmable gate arrays (FPGAs) and the like; programmable logic devices (PLDs) such as complex PLDs (CPLDs) or high-capacity PLDs (HCPLDs); ASICs such as structured ASICs; programmable SoCs (PSoCs), or combinations of them, among others. In such implementations, the circuitry of application circuitry 405 may include logic blocks or logic fabric, and other interconnected resources that may be programmed to perform various functions, such as the procedures, methods, functions described herein. In some examples, the circuitry of application circuitry 405 may include memory cells (e.g., erasable programmable read-only memory (EPROM), electrically erasable programmable read-only memory (EEPROM), flash memory, static memory (e.g., static random access memory (SRAM) or anti-fuses)) used to store logic blocks, logic fabric, data, or other data in look-up-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 410 are discussed with regard to FIG. 4.

The user interface circuitry 450 may include one or more user interfaces designed to enable user interaction with the system 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, or combinations of them, among others. Peripheral component interfaces may include, but are not limited to, a nonvolatile memory port, a universal serial bus (USB) port, an audio jack, a power supply interface, among others.

The radio front end modules (RFEMs) 415 may include a millimeter wave (mmWave) RFEM and one or more sub-mmWave radio frequency integrated circuits (RFICs). In some examples, the one or more sub-mmWave RFICs may be physically separated from the mmWave RFEM. The RFICs may include connections to one or more antennas or antenna arrays (see, e.g., antenna array 611 of FIG. 4), and the RFEM may be connected to multiple antennas. In some examples, both mmWave and sub-mmWave radio functions may be implemented in the same physical RFEM 415, which incorporates both mmWave antennas and sub-mmWave.

The memory circuitry 420 may include one or more of volatile memory, such as dynamic random access memory (DRAM) or synchronous dynamic random access memory (SDRAM), and nonvolatile memory (NVM), such as high-speed electrically erasable memory (commonly referred to as Flash memory), phase change random access memory (PRAM), or magnetoresistive random access memory (MRAM), or combinations of them, among others. In some examples, the memory circuitry 420 may include three-dimensional (3D) cross-point (XPOINT) memories from Intel® and Micron®. Memory circuitry 420 may be implemented as one or more of solder down packaged integrated circuits, socketed memory modules and plug-in memory cards, for example.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to and from the infrastructure equipment 400 using network interface connector 440 using a physical connection, which may be electrical (commonly referred to as a "copper interconnect"), optical, or wireless. The network controller circuitry 435 may include one or more dedicated processors or FPGAs, or both, to communicate using one or more of the aforementioned protocols. In some examples, the network controller circuitry 435 may include multiple controllers to provide connectivity to other networks using the same or different protocols.

The positioning circuitry 445 includes circuitry to receive and decode signals transmitted or broadcasted by a positioning network of a global navigation satellite system (GNSS). Examples of a GNSS include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS)), among other systems. The positioning circuitry 445 can include various hardware elements (e.g., including hardware devices such as switches, filters, amplifiers, antenna elements, and the like to facilitate OTA communications) to communicate with components of a positioning network, such as navigation satellite constellation nodes. In some examples, the positioning circuitry 445 may include a Micro-Technology for Positioning, Navigation, and Timing (Micro-PNT) IC that uses a master timing clock to perform position tracking and estimation without GNSS assistance. The positioning circuitry 445 may also be part of, or interact with, the baseband circuitry 410 or RFEMs 415, or both, to communicate with the nodes and components of the positioning network. The positioning circuitry 445 may also provide data (e.g., position data, time data) to the application circuitry 405, which may use the data to synchronize operations with various infrastructure (e.g., RAN nodes 111).

The components shown by FIG. 2 may communicate with one another using interface circuitry, which may include any number of bus or interconnect (IX) technologies such as industry standard architecture (ISA), extended ISA (EISA), peripheral component interconnect (PCI), peripheral component interconnect extended (PCIx), PCI express (PCIe), or any number of other technologies. The bus or IX may be a proprietary bus, for example, used in a SoC based system. Other bus or IX systems may be included, such as an I2C interface, an SPI interface, point to point interfaces, and a power bus, among others.

FIG. 3 illustrates an example of a platform 500 (or "device 500"). In some examples, the computer platform 500 may be suitable for use as UEs 101, 201, 301, application servers 130, or any other component or device discussed herein. The platform 500 may include any combinations of the components shown in the example. The components of platform 500 (or portions thereof) may be implemented as integrated circuits (ICs), discrete electronic devices, or other modules, logic, hardware, software, firmware, or a combination of them adapted in the computer platform 500, or as components otherwise incorporated within a chassis of a larger system. The block diagram of FIG. 3 is intended to show a high level view of components of the platform 500. However, in some examples, the platform 500 may include fewer, additional, or alternative components, or a different arrangement of the components shown in FIG. 3.

The application circuitry 505 includes circuitry such as, but not limited to, one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 505 may be coupled with or may include memory/storage elements and may be configured to execute instructions stored in the memory or storage to enable various applications or operating systems to run on the system 500. In some examples, the memory or storage elements may be on-chip memory circuitry, which may include any suitable volatile or nonvolatile memory, such as DRAM, SRAM, EPROM, EEPROM, Flash memory, solid-state memory, or combinations of them, among other types of memory.

The processor(s) of application circuitry 405 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some examples, the application circuitry 405 may include, or may be, a special-purpose processor/controller to carry out the techniques described herein.

As examples, the processor(s) of application circuitry 505 may include an Intel® Architecture Core™ based processor, such as a Quark™ an Atom™, an i3, an i5, an i7, or an MCU-class processor, or another such processor available from Intel® Corporation, Santa Clara, CA The processors of the application circuitry 505 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some examples, the application circuitry 505 may be a part of a system on a chip (SoC) in which the application circuitry 505 and other components are formed into a single integrated circuit, or a single package, such as the Edison™ or Galileo™ SoC boards from Intel® Corporation.

Additionally or alternatively, the application circuitry 505 may include circuitry such as, but not limited to, one or more a field-programmable devices (FPDs) such as FPGAs; programmable logic devices (PLDs) such as complex PLDs (CPLDs), high-capacity PLDs (HCPLDs); ASICs such as structured ASICs; programmable SoCs (PSoCs), or combinations of them, among others. In some examples, the application circuitry 505 may include logic blocks or logic fabric, and other interconnected resources that may be programmed to perform various functions, such as the procedures, methods, functions described herein. In some examples, the application circuitry 505 may include memory cells (e.g., erasable programmable read-only memory (EPROM), electrically erasable programmable read-only memory (EEPROM), flash memory, static memory (e.g., static random access memory (SRAM), or anti-fuses)) used to store logic blocks, logic fabric, data, or other data in look-up tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed with regard to FIG. 4.

The RFEMs 515 may comprise a millimeter wave (mmWave) RFEM and one or more sub-mmWave radio frequency integrated circuits (RFICs). In some examples, the one or more sub-mmWave RFICs may be physically separated from the mmWave RFEM. The RFICs may include connections to one or more antennas or antenna arrays (see, e.g., antenna array 611 of FIG. 4), and the RFEM may be connected to multiple antennas. In some examples, both mmWave and sub-mmWave radio functions may be implemented in the same physical RFEM 515, which incorporates both mmWave antennas and sub-mmWave.

The memory circuitry 520 may include any number and type of memory devices used to provide for a given amount of system memory. As examples, the memory circuitry 520 may include one or more of volatile memory, such as random access memory (RAM), dynamic RAM (DRAM) or synchronous dynamic RAM (SDRAM), and nonvolatile memory (NVM), such as high-speed electrically erasable memory (commonly referred to as Flash memory), phase change random access memory (PRAM), or magnetoresistive random access memory (MRAM), or combinations of them, among others. The memory circuitry 520 may be developed in accordance with a Joint Electron Devices Engineering Council (JEDEC) low power double data rate (LPDDR)-based design, such as LPDDR2, LPDDR3, LPDDR4, or the like. Memory circuitry 520 may be implemented as one or more of solder down packaged integrated circuits, single die package (SDP), dual die package (DDP) or quad die package (Q17P), socketed memory modules, dual inline memory modules (DIMMs) including microDIMMs or MiniDiMMs, or soldered onto a motherboard using a ball grid array (BGA). In low power implementations, the memory circuitry 520 may be on-die memory or registers associated with the application circuitry 505. To provide for persistent storage of information such as data, applications, operating systems and so forth, memory circuitry 520 may include one or more mass storage devices, which may include, for example, a solid state disk drive (SSDD), hard disk drive (HDD), a micro HDD, resistance change memories, phase change memories, holographic memories, or chemical memories, among others. In some examples, the computer platform 500 may incorporate the three-dimensional (3D) cross-point (XPOINT) memories from Intel® and Micron®.

The removable memory circuitry 523 may include devices, circuitry, enclosures, housings, ports or receptacles, among others, used to couple portable data storage devices with the platform 500. These portable data storage devices may be used for mass storage purposes, and may include, for example, flash memory cards (e.g., Secure Digital (SD) cards, microSD cards, xD picture cards), and USB flash drives, optical discs, or external HDDs, or combinations of them, among others.

The platform 500 may also include interface circuitry (not shown) for connecting external devices with the platform 500. The external devices connected to the platform 500 using the interface circuitry include sensor circuitry 521 and electro-mechanical components (EMCs) 522, as well as removable memory devices coupled to removable memory circuitry 523.

The sensor circuitry 521 include devices, modules, or subsystems whose purpose is to detect events or changes in its environment and send the information (e.g., sensor data) about the detected events to one or more other devices, modules, or subsystems. Examples of such sensors include inertial measurement units (IMUs) such as accelerometers, gyroscopes, or magnetometers; microelectromechanical systems (MEMS) or nanoelectromechanical systems (NEMS) including 3-axis accelerometers, 3-axis gyroscopes, or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other audio capture devices, or combinations of them, among others.

The EMCs 522 include devices, modules, or subsystems whose purpose is to enable the platform 500 to change its state, position, or orientation, or move or control a mechanism, system, or subsystem. Additionally, the EMCs 522 may be configured to generate and send messages or signaling to other components of the platform 500 to indicate a current state of the EMCs 522. Examples of the EMCs 522 include one or more power switches, relays, such as electromechanical relays (EMRs) or solid state relays (SSRs), actuators (e.g., valve actuators), an audible sound generator, a visual warning device, motors (e.g., DC motors or stepper motors), wheels, thrusters, propellers, claws, clamps, hooks, or combinations of them, among other electro-mechanical components. In some examples, the platform 500 is configured to operate one or more EMCs 522 based on one or more captured events, instructions, or control signals received from a service provider or clients, or both.

In some examples, the interface circuitry may connect the platform 500 with positioning circuitry 545. The positioning circuitry 545 includes circuitry to receive and decode signals transmitted or broadcasted by a positioning network of a GNSS. Examples of a GNSS include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, among other systems. The positioning circuitry 545 comprises various hardware elements (e.g., including hardware devices such as switches, filters, amplifiers, antenna elements, and the like to facilitate OTA communications) to communicate with components of a positioning network, such as navigation satellite constellation nodes. In some examples, the positioning circuitry 545 may include a Micro-PNT IC that uses a master timing clock to perform position tracking or estimation without GNSS assistance. The positioning circuitry 545 may also be part of, or interact with, the baseband circuitry 410 or RFEMs 515, or both, to communicate with the nodes and components of the positioning network. The positioning circuitry 545 may also provide data (e.g., position data, time data) to the application circuitry 505, which may use the data to synchronize operations with various infrastructure (e.g., radio base stations), for turn-by-turn navigation applications, or the like.

In some examples, the interface circuitry may connect the platform 500 with Near-Field Communication (NFC) circuitry 540. The NFC circuitry 540 is configured to provide contactless, short-range communications based on radio frequency identification (RFID) standards, in which magnetic field induction is used to enable communication between NFC circuitry 540 and NFC-enabled devices external to the platform 500 (e.g., an "NFC touchpoint"). The NFC circuitry 540 includes an NFC controller coupled with an antenna element and a processor coupled with the NFC controller. The NFC controller may be a chip or IC providing NFC functionalities to the NFC circuitry 540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 540, or initiate data transfer between the NFC circuitry 540 and another active NFC device (e.g., a smartphone or an NFC-enabled POS terminal) that is proximate to the platform 500.

The driver circuitry 546 may include software and hardware elements that operate to control particular devices that are embedded in the platform 500, attached to the platform 500, or otherwise communicatively coupled with the platform 500. The driver circuitry 546 may include individual drivers allowing other components of the platform 500 to interact with or control various input/output (I/O) devices that may be present within, or connected to, the platform 500. For example, the driver circuitry 546 may include a display driver to control and allow access to a display device, a touchscreen driver to control and allow access to a touchscreen interface of the platform 500, sensor drivers to obtain sensor readings of sensor circuitry 521 and control and allow access to sensor circuitry 521, EMC drivers to obtain actuator positions of the EMCs 522 or control and allow access to the EMCs 522, a camera driver to control and allow access to an embedded image capture device, audio drivers to control and allow access to one or more audio devices.

The power management integrated circuitry (PMIC) 525 (also referred to as "power management circuitry 525") may manage power provided to various components of the platform 500. In particular, with respect to the baseband circuitry 510, the PMIC 525 may control power-source selection, voltage scaling, battery charging, or DC-to-DC conversion. The PMIC 525 may be included when the platform 500 is capable of being powered by a battery 530, for example, when the device is included in a UE 101, 201, 301.

In some examples, the PMIC 525 may control, or otherwise be part of, various power saving mechanisms of the platform 500. For example, if the platform 500 is in an RRC_Connected state, where it is still connected to the RAN node as it expects to receive traffic shortly, then it may enter a state known as Discontinuous Reception Mode (DRX) after a period of inactivity. During this state, the platform 500 may power down for brief intervals of time and thus save power. If there is no data traffic activity for an extended period of time, then the platform 500 may transition off to an RRC_Idle state, where it disconnects from the network and does not perform operations such as channel quality feedback or handover. This can allow the platform 500 to enter a very low power state, where it periodically wakes up to listen to the network and then powers down again. In some examples, the platform 500 may not receive data in the RRC_Idle state and instead must transition back to RRC_Connected state to receive data. An additional power saving mode may allow a device to be unavailable to the network for periods longer than a paging interval (ranging from seconds to a few hours). During this time, the device may be unreachable to the network and may power down completely. Any data sent during this time may incurs a large delay and it is assumed the delay is acceptable.

A battery 530 may power the platform 500, although in some examples the platform 500 may be deployed in a fixed location, and may have a power supply coupled to an electrical grid. The battery 530 may be a lithium ion battery, a metal-air battery, such as a zinc-air battery, an aluminum-air battery, or a lithium-air battery, among others, in some examples, such as in V2X applications, the battery 530 may be a typical lead-acid automotive battery.

In some examples, the battery 530 may be a "smart battery," which includes or is coupled with a Battery Management System (BMS) or battery monitoring integrated circuitry. The BMS may be included in the platform 500 to track the state of charge (SoCh) of the battery 530. The BMS may be used to monitor other parameters of the battery 530 to provide failure predictions, such as the state of health (SoH) and the state of function (SoF) of the battery 530. The BMS may communicate the information of the battery 530 to the application circuitry 505 or other components of the platform 500. The BMS may also include an analog-to-digital (ADC) convertor that allows the application circuitry 505 to directly monitor the voltage of the battery 530 or the current flow from the battery 530. The battery parameters may be used to determine actions that the platform 500 may perform, such as transmission frequency, network operation, or sensing frequency, among others.

A power block, or other power supply coupled to an electrical grid may be coupled with the BMS to charge the battery 530. In some examples, the power block 530 may be replaced with a wireless power receiver to obtain the power wirelessly, for example, through a loop antenna in the computer platform 500. In these examples, a wireless battery charging circuit may be included in the BMS. The specific charging circuits chosen may depend on the size of the battery 530, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

The user interface circuitry 550 includes various input/output (I/O) devices present within, or connected to, the platform 500, and includes one or more user interfaces designed to enable user interaction with the platform 500 or peripheral component interfaces designed to enable peripheral component interaction with the platform 500. The user interface circuitry 550 includes input device circuitry and output device circuitry. Input device circuitry includes any physical or virtual means for accepting an input including one or more physical or virtual buttons (e.g., a reset button), a physical keyboard, keypad, mouse, touchpad, touchscreen, microphones, scanner, or headset, or combinations of them, among others. The output device circuitry includes any physical or virtual means for showing information or otherwise conveying information, such as sensor readings, actuator position(s), or other information. Output device circuitry may include any number or combinations of audio or visual display, including one or more simple visual outputs or indicators (e.g., binary status indicators (e.g., light emitting diodes (LEDs)), multi-character visual outputs, or more complex outputs such as display devices or touchscreens (e.g., Liquid Chrystal Displays (LCD), LED displays, quantum dot displays, or projectors), with the output of characters, graphics, or multimedia objects being generated or produced from the operation of the platform 500. The output device circuitry may also include speakers or other audio emitting devices, or printer(s). In some examples, the sensor circuitry 521 may be used as the input device circuitry (e.g., an image capture device or motion capture device), and one or more EMCs may be used as the output device circuitry (e.g., an actuator to provide haptic feedback). In another example, NFC circuitry comprising an NFC controller coupled with an antenna element and a processing device may be included to read electronic tags or connect with another NFC-enabled device. Peripheral component interfaces may include, but are not limited to, a non-volatile memory port, a USB port, an audio jack, or a power supply interface.

Although not shown, the components of platform 500 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus or IX may be a proprietary bus or IX, for example, used in a SoC based system. Other bus or IX systems may be included, such as an I2C interface, an SPI interface, point-to-point interfaces, and a power bus, among others.

Figure 4:
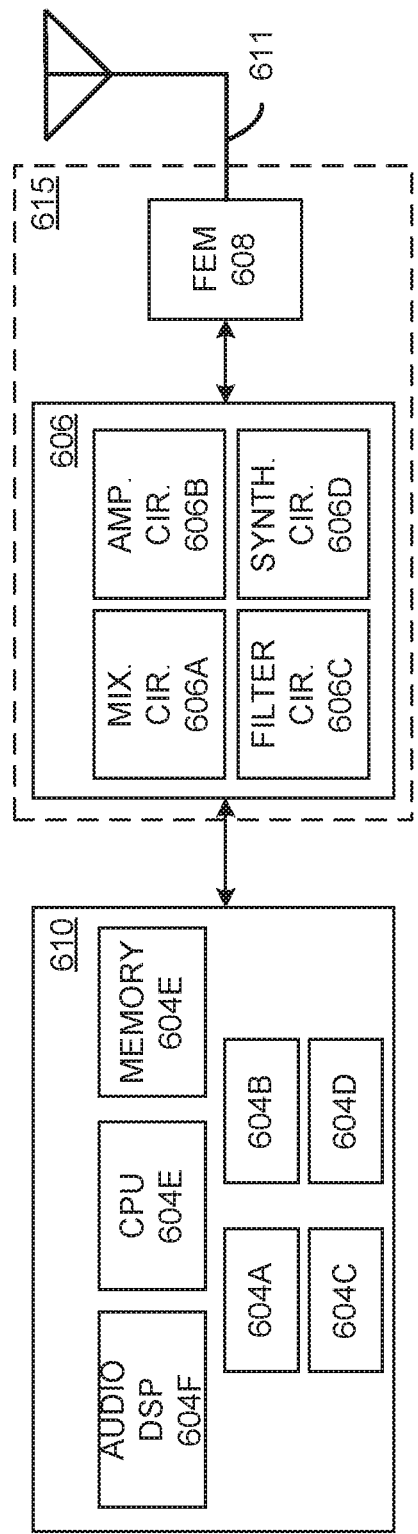
FIG. 4 illustrates example components of baseband circuitry and radio front end circuitry.

FIG. 4 illustrates example components of baseband circuitry 610 and radio front end modules (RFEM) 615. The baseband circuitry 610 can correspond to the baseband circuitry 410 and 510 of FIGS. 4 and 5, respectively. The RFEM 615 can correspond to the RFEM 415 and 515 of FIGS. 4 and 5, respectively. As shown, the RFEMs 615 may include Radio Frequency (RF) circuitry 606, front-end module (FEM) circuitry 608, antenna array 611 coupled together.

The baseband circuitry 610 includes circuitry or control logic, or both, configured to carry out various radio or network protocol and control functions that enable communication with one or more radio networks using the RF circuitry 606. The radio control functions may include, but are not limited to, signal modulation and demodulation, encoding and decoding, and radio frequency shifting. In some examples, modulation and demodulation circuitry of the baseband circuitry 610 may include Fast-Fourier Transform (FFT), preceding, or constellation mapping and demapping functionality. In some examples, encoding and decoding circuitry of the baseband circuitry 610 may include convolution, tail-biting convolution, turbo, Viterbi, or Low Density Parity Check (LDPC) encoder and decoder functionality. Modulation and demodulation and encoder and decoder functionality are not limited to these examples and may include other suitable functionality in other examples. The baseband circuitry 610 is configured to process baseband signals received from a receive signal path of the RF circuitry 606 and to generate baseband signals for a transmit signal path of the RF circuitry 606. The baseband circuitry 610 is configured to interface with application circuitry (e.g., the application circuitry 405, 505 shown in FIGS. 4 and 5) for generation and processing of the baseband signals and for controlling operations of the RF circuitry 606. The baseband circuitry 610 may handle various radio control functions.

The aforementioned circuitry and control logic of the baseband circuitry 610 may include one or more single or multi-core processors. For example, the one or more processors may include a 3G baseband processor 604A, a 4G or LIE baseband processor 604B, a 5G or NR baseband processor 604C, or some other baseband processor(s) 604D for other existing generations, generations in development or to be developed in the future (e.g., sixth generation (6G)). In some examples, some or all of the functionality of baseband processors 604A-D may be included in modules stored in the memory 604G and executed using a Central Processing Unit (CPU) 604E. In some examples, some or all of the functionality of baseband processors 604A-D may be provided as hardware accelerators (e.g., FPGAs or ASICs) loaded with the appropriate bit streams or logic blocks stored in respective memory cells. In some examples, the memory 604G may store program code of a real-time OS (RTOS) which, when executed by the CPU 604E (or other baseband processor), is to cause the CPU 604E (or other baseband processor) to manage resources of the baseband circuitry 610, schedule tasks, or carry out other operations. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 610 includes one or more audio digital signal processor(s) (DSP) 604F. The audio DSP(s) 604F include elements for compression and decompression and echo cancellation and may include other suitable processing elements in some examples.

In some examples, each of the processors 604A-604E include respective memory interfaces to send and receive data to and from the memory 604G. The baseband circuitry 610 may further include one or more interfaces to communicatively couple to other circuitries or devices, such as an interface to send and receive data to and from memory external to the baseband circuitry 610; an application circuitry interface to send and receive data to and from the application circuitry 405, 505 of FIGS. 4 and 6); an RF circuitry interface to send and receive data to and from RF circuitry 606 of FIG. 4; a wireless hardware connectivity interface to send and receive data to and from one or more wireless hardware elements (e.g., Near Field Communication (NFC) components, Bluetooth®/Bluetooth® Low Energy components, Wi-Fi® components, and/or the like); and a power management interface to send and receive power or control signals to and from the PMIC 525.

In some examples (which may be combined with the above described examples), the baseband circuitry 610 includes one or more digital baseband systems, which are coupled with one another using an interconnect subsystem and to a CPU subsystem, an audio subsystem, and an interface subsystem. The digital baseband subsystems may also be coupled to a digital baseband interface and a mixed-signal baseband subsystem using another interconnect subsystem. Each of the interconnect subsystems may include a bus system, point-to-point connections, network-on-chip (NOC) structures, or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, among other components. In some examples, the baseband circuitry 610 may include protocol processing circuitry with one or more instances of control circuitry (not shown) to provide control functions for the digital baseband circuitry or radio frequency circuitry (e.g., the radio front end modules 615).

Although not shown in FIG. 4, in some examples, the baseband circuitry 610 includes individual processing device(s) to operate one or more wireless communication protocols (e.g., a "multi-protocol baseband processor" or "protocol processing circuitry") and individual processing device(s) to implement PHY layer functions. In some examples, the PHY layer functions include the aforementioned radio control functions. In some examples, the protocol processing circuitry operates or implements various protocol layers or entities of one or more wireless communication protocols. For example, the protocol processing circuitry may operate LTE protocol entities or 5G NR protocol entities, or both, when the baseband circuitry 610 or RF circuitry 606, or both, are part of mmWave communication circuitry or some other suitable cellular communication circuitry. In this example, the protocol processing circuitry can operate MAC, RLC, PDCP, SDAP, RRC, and NAS functions. In some examples, the protocol processing circuitry may operate one or more IEEE-based protocols when the baseband circuitry 610 or RF circuitry 606, or both, are part of a Wi-Fi communication system. In this example, the protocol processing circuitry can operate Wi-Fi MAC and logical link control (LLC) functions. The protocol processing circuitry may include one or more memory structures (e.g., 604G) to store program code and data for operating the protocol functions, as well as one or more processing cores to execute the program code and perform various operations using the data. The baseband circuitry 610 may also support radio communications for more than one wireless protocol.

The various hardware elements of the baseband circuitry 610 discussed herein may be implemented, for example, as a solder-down substrate including one or more integrated circuits (ICs), a single packaged IC soldered to a main circuit board or a multi-chip module containing two or more ICs. In some examples, the components of the baseband circuitry 610 may be suitably combined in a single chip or chipset, or disposed on a same circuit board. In some examples, some or all of the constituent components of the baseband circuitry 610 and RF circuitry 606 may be implemented together such as, for example, a system on a chip (SoC) or System-in-Package (SiP). In some examples, some or all of the constituent components of the baseband circuitry 610 may be implemented as a separate SoC that is communicatively coupled with and RF circuitry 606 (or multiple instances of RF circuitry 606). In some examples, some or all of the constituent components of the baseband circuitry 610 and the application circuitry 405, 505 may be implemented together as individual SoCs mounted to a same circuit board (e.g., a "multi-chip package").

In some examples, the baseband circuitry 610 may provide for communication compatible with one or more radio technologies. For example, the baseband circuitry 610 may support communication with an E-UTRAN or other WMAN, a WLAN, or a WPAN. Examples in which the baseband circuitry 610 is configured to support radio communications of more than one wireless protocol may be referred to as multi-mode baseband circuitry.

The RF circuitry 606 may enable communication with wireless networks using modulated electromagnetic radiation through a non-solid medium. In some examples, the RF circuitry 606 may include switches, filters, or amplifiers, among other components, to facilitate the communication with the wireless network. The RF circuitry 606 may include a receive signal path, which may include circuitry to down-convert RF signals received from the FEM circuitry 608 and provide baseband signals to the baseband circuitry 610. The RF circuitry 606 may also include a transmit signal path, which may include circuitry to up-convert baseband signals provided by the baseband circuitry 610 and provide RF output signals to the FEM circuitry 608 for transmission.

The receive signal path of the RF circuitry 606 includes mixer circuitry 606a, amplifier circuitry 606b and filter circuitry 606c. In some examples, the transmit signal path of the RF circuitry 606 may include filter circuitry 606c and mixer circuitry 606a. The RF circuitry 606 also includes synthesizer circuitry 606d for synthesizing a frequency for use by the mixer circuitry 606a of the receive signal path and the transmit signal path. In some examples, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 610 for further processing. In some examples, the output baseband signals may be zero-frequency baseband signals, although this is not a requirement. In some examples, the mixer circuitry 606a of the receive signal path may comprise passive mixers.

In some examples, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 610 and may be filtered by filter circuitry 606c.

In some examples, the mixer circuitry 606a of the receive signal path and the mixer circuitry 606a of the transmit signal path may include two or more mixers and may be arranged for quadrature downconversion and upconversion, respectively. In some examples, the mixer circuitry 606a of the receive signal path and the mixer circuitry 606a of the transmit signal path may include two or more mixers and may be arranged for image rejection (e.g., Hartley image rejection). In some examples, the mixer circuitry 606a of the receive signal path and the mixer circuitry 606a of the transmit signal path may be arranged for direct downconversion and direct upconversion, respectively. In some examples, the mixer circuitry 606a of the receive signal path and the mixer circuitry 606a of the transmit signal path may be configured for super-heterodyne operation.

In some examples, the output baseband signals and the input baseband signals may be analog baseband signals. In some examples, the output baseband signals and the input baseband signals may be digital baseband signals, and the RF circuitry 606 may include analog-to-digital converter (ADC) and digital-to-analog converter (DAC) circuitry and the baseband circuitry 610 may include a digital baseband interface to communicate with the RF circuitry 606.

In some dual-mode examples, a separate radio IC circuitry may be provided for processing signals for each spectrum, although the techniques described here are not limited in this respect.

In some examples, the synthesizer circuitry 606d may be a fractional-N synthesizer or a fractional N/N+1 synthesizer, although other types of frequency synthesizers may used. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some examples, the synthesizer circuitry 606d may be a fractional N/N+1 synthesizer.

In some examples, frequency input may be provided by a voltage controlled oscillator (VCO), although that is not a requirement. Divider control input may be provided by either the baseband circuitry 610 or the application circuitry 405/505 depending on the desired output frequency. In some examples, a divider control input (e.g., N) may be determined from a look-up table based on a channel indicated by the application circuitry 405, 505.

The synthesizer circuitry 606d of the RF circuitry 606 may include a divider, a delay-locked loop (DLL), a multiplexer and a phase accumulator. In some examples, the divider may be a dual modulus divider (DMD) and the phase accumulator may be a digital phase accumulator (DPA). In some examples, the DMD may be configured to divide the input signal by either N or N+1 (e.g., based on a carry out) to provide a fractional division ratio. In some examples, the DLL may include a set of cascaded, tunable, delay elements, a phase detector, a charge pump and a D-type flip-flop. The delay elements may be configured to break a VCO period up into Nd equal packets of phase, where Nd is the number of delay elements in the delay line. In this way, the DLL provides negative feedback to help ensure that the total delay through the delay line is one VCO cycle.

In some examples, synthesizer circuitry 606d may be configured to generate a carrier frequency as the output frequency, while in other examples, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some examples, the output frequency may be a LO frequency (fLO). In some examples, the RF circuitry 606 may include an IQ or polar converter.

The FEM circuitry 608 may include a receive signal path, which may include circuitry configured to operate on RF signals received from antenna array 611, amplify the received signals and provide the amplified versions of the received signals to the RF circuitry 606 for further processing. The FEM circuitry 608 may also include a transmit signal path, which may include circuitry configured to amplify signals for transmission provided by the RF circuitry 606 for transmission by one or more of antenna elements of antenna array 611. The amplification through the transmit or receive signal paths may be done solely in the RF circuitry 606, solely in the FEM circuitry 608, or in both the RF circuitry 606 and the FEM circuitry 608.

In some examples, the FEM circuitry 608 may include a TX/RX switch to switch between transmit mode and receive mode operation. The FEM circuitry 608 may include a receive signal path and a transmit signal path. The receive signal path of the FEM circuitry 608 may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission by one or more antenna elements of the antenna array 611.

The antenna array 611 comprises one or more antenna elements, each of which is configured convert electrical signals into radio waves to travel through the air and to convert received radio waves into electrical signals. For example, digital baseband signals provided by the baseband circuitry 610 is converted into analog RF signals (e.g., modulated waveform) that will be amplified and transmitted using the antenna elements of the antenna array 611 including one or more antenna elements (not shown). The antenna elements may be omnidirectional, directional, or a combination thereof. The antenna elements may be formed in a multitude of arranges as are known and/or discussed herein. The antenna array 611 may comprise microstrip antennas or printed antennas that are fabricated on the surface of one or more printed circuit boards. The antenna array 611 may be formed as a patch of metal foil (e.g., a patch antenna) in a variety of shapes, and may be coupled with the RF circuitry 606 and/or FEM circuitry 608 using metal transmission lines or the like.

Processors of the application circuitry 405/505 and processors of the baseband circuitry 610 may be used to execute elements of one or more instances of a protocol stack. For example, processors of the baseband circuitry 610, alone or in combination, may be used execute Layer 3, Layer 2, or Layer 1 functionality, while processors of the application circuitry 405, 505 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 5:
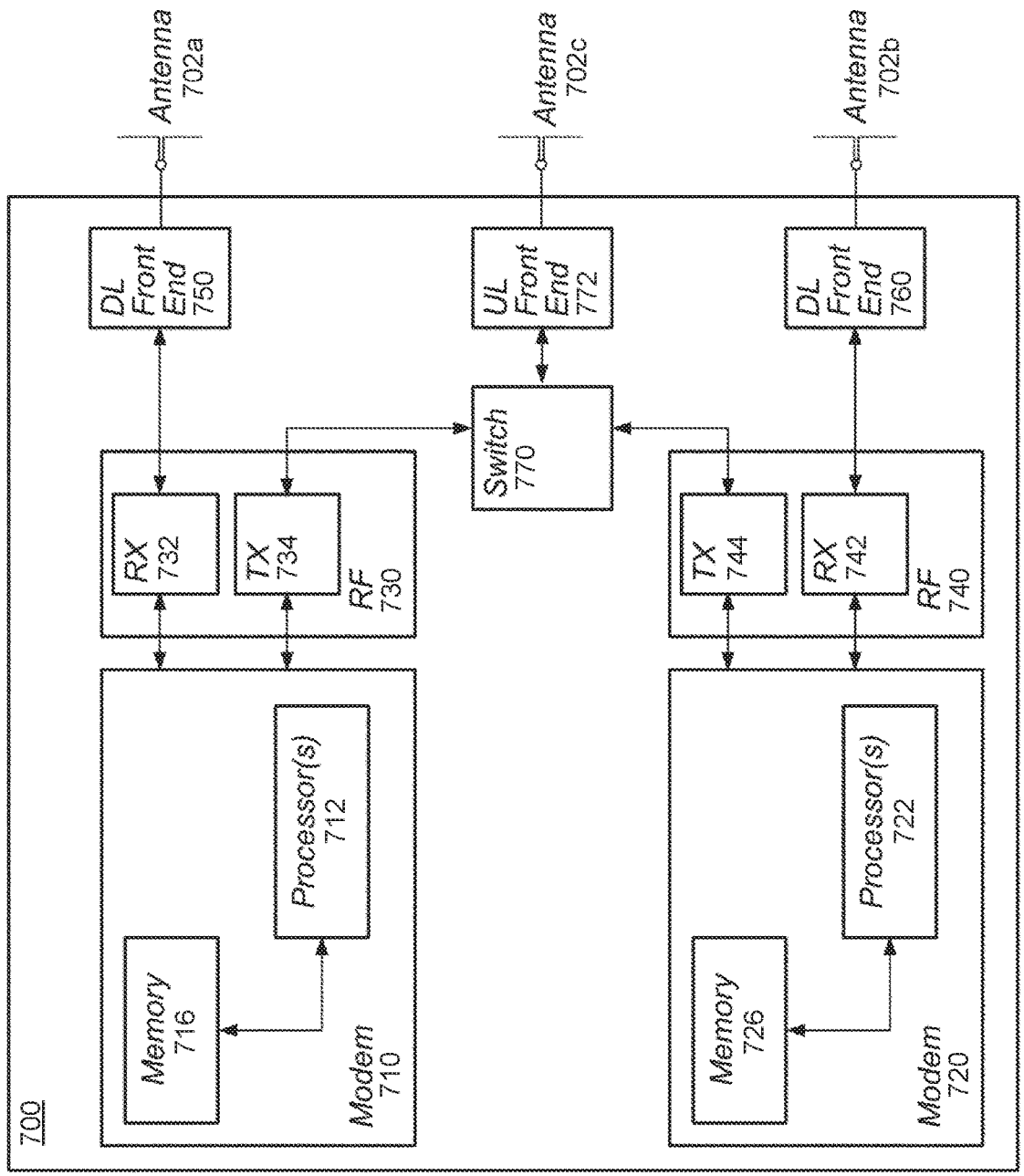
FIG. 5 illustrates example components of cellular communication circuitry.

FIG. 5 illustrates example components of communication circuitry 700. In some examples, the communication circuitry 700 may be implemented as part of the system 400 or the platform 500 shown in FIGS. 4 and 5. The communication circuitry 700 may be communicatively coupled (e.g., directly or indirectly) to one or more antennas, such as antennas 702a-c. In some examples, the communication circuitry 700 includes or is communicatively coupled to dedicated receive chains, processors, or radios, or combinations of them, for multiple RATs (e.g., a first receive chain for LTE and a second receive chain for 5G NR). For example, as shown in FIG. 5, the communication circuitry 700 includes a modem 710 and a modem 720, which may correspond to or be a part of the baseband circuitry 410 and 510 of FIGS. 4 and 5. The modem 710 may be configured for communications according to a first RAT, such as LTE or LTE-A, and the modem 720 may be configured for communications according to a second RAT, such as 5G NR.

The modem 710 includes one or more processors 712 and a memory 716 in communication with the processors 712. The modem 710 is in communication with a radio frequency (RF) front end 730, which may correspond to or be a part of to the RFEM 415 and 515 of FIGS. 4 and 5. The RF front end 730 may include circuitry for transmitting and receiving radio signals. For example, the RF front end 730 includes receive circuitry (RX) 732 and transmit circuitry (TX) 734. In some examples, the receive circuitry 732 is in communication with a DL front end 750, which may include circuitry for receiving radio signals from the antenna 702a. A switch 770 may selectively couple the modem 710 to an UL front end 772, which may include circuitry for transmitting radio signals using the antenna 702c.

Similarly, the modem 720 includes one or more processors 722 and a memory 726 in communication with the processors 722. The modem 720 is in communication with an RF front end 740, which may correspond to or be a part of to the RFEM 415 and 515 of FIGS. 4 and 5. The RF front end 740 may include circuitry for transmitting and receiving radio signals. For example, the RF front end 740 includes receive circuitry 742 and transmit circuitry 744. In some examples, the receive circuitry 742 is in communication with a DL front end 760, which may include circuitry for receiving radio signals from the antenna 702b. The switch 770 may selectively couple the modem 720 to the UL front end 772 for transmitting radio signals using the antenna 702c.

The modem 710 may include hardware and software components for time division multiplexing UL data (e.g., for NSA NR operations), as well as the various other techniques described herein. The processors 712 may include one or more processing elements configured to implement various features described herein, such as by executing program instructions stored on the memory 716 (e.g., a non-transitory computer-readable memory medium). In some examples, the processor 712 may be configured as a programmable hardware element, such as a FPGA or an ASIC. In some examples, the processors 712 may include one or more ICs that are configured to perform the functions of processors 712. For example, each IC may include circuitry configured to perform the functions of processors 712.

The modem 720 may include hardware and software components for time division multiplexing UL data (e.g., for NSA NR operations), as well as the various other techniques described herein. The processors 722 may include one or more processing elements configured to implement various features described herein, such as by executing instructions stored on the memory 726 (e.g., a non-transitory computer-readable memory medium). In some examples, the processor 722 may be configured as a programmable hardware element, such as a FPGA or an ASIC. In some examples, the processor 722 may include one or more ICs that are configured to perform the functions of processors 722. For example, each IC may include circuitry configured to perform the functions of processors 522.

Figure 6:
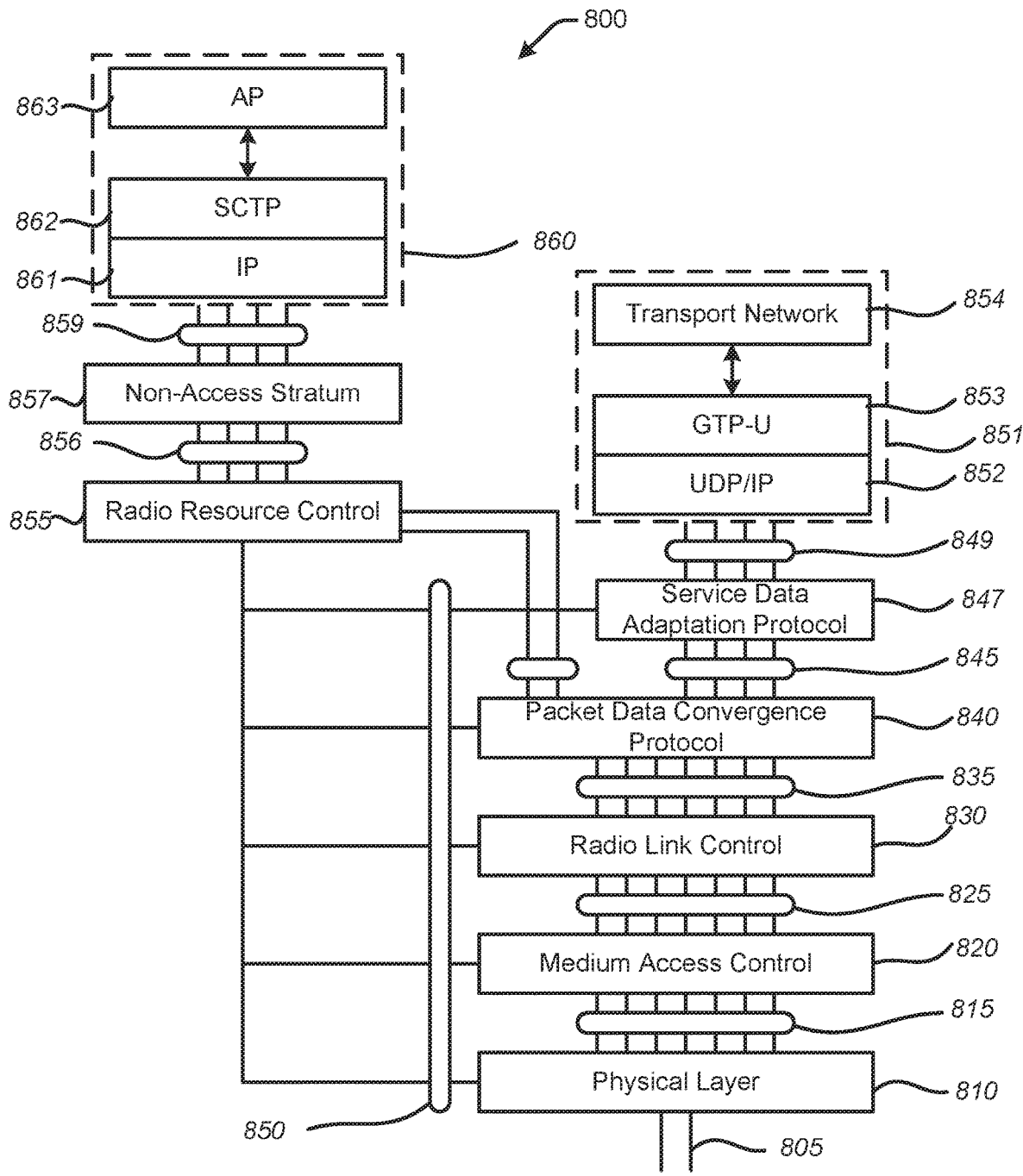
FIG. 6 illustrates example protocol functions that may be implemented in wireless communication systems.

FIG. 6 illustrates various protocol functions that may be implemented in a wireless communication device. In particular, FIG. 6 includes an arrangement 800 showing interconnections between various protocol layers/entities. The following description of FIG. 6 is provided for various protocol layers and entities that operate in conjunction with the 5G NR system standards and the LTE system standards, but some or all of the aspects of FIG. 6 may be applicable to other wireless communication network systems as well.

The protocol layers of arrangement 800 may include one or more of PINY 810, MAC 820, RLC 830, PDCP 840, SDAP 847, RRC 855, and NAS layer 857, in addition to other higher layer functions not illustrated. The protocol layers may include one or more service access points (e.g., items 859, 856, 850, 849, 845, 835, 825, and 815 in FIG. 6) that may provide communication between two or more protocol layers.

The PHY 810 may transmit and receive physical layer signals 805 that may be received from or transmitted to one or more other communication devices. The physical layer signals 805 may include one or more physical channels, such as those discussed herein. The PHY 810 may further perform link adaptation or adaptive modulation and coding (AMC), power control, cell search (e.g., for initial synchronization and handover purposes), and other measurements used by higher layers, such as the RRC 855. The PHY 810 may still further perform error detection on the transport channels, forward error correction (FEC) coding and decoding of the transport channels, modulation and demodulation of physical channels, interleaving, rate matching, mapping onto physical channels, and MIMO antenna processing. In some examples, an instance of PHY 810 may process requests from and provide indications to an instance of MAC 820 using one or more PHY-SAP 815. In some examples, requests and indications communicated using PHY-SAP 815 may comprise one or more transport channels.

Instance(s) of MAC 820 may process requests from, and provide indications to, an instance of RLC 830 using one or more MAC-SAPs 825. These requests and indications communicated using the MAC-SAP 825 may include one or more logical channels. The MAC 820 may perform mapping between the logical channels and transport channels, multiplexing of MAC service data units (SDUs) from one or more logical channels onto transport blocks (TBs) to be delivered to PHY 810 using the transport channels, demultiplexing MAC SDUs to one or more logical channels from TBs delivered from the PHY 810 using transport channels, multiplexing MAC SDUs onto TBs, scheduling information reporting, error correction through HAM and logical channel prioritization.

Instance(s) of RLC 830 may process requests from and provide indications to an instance of PDCP 840 using one or more radio link control service access points (RLC-SAP) 835. These requests and indications communicated using RLC-SAP 835 may include one or more RLC channels. The RLC 830 may operate in a plurality of modes of operation, including: Transparent Mode (TM), Unacknowledged Mode (UM), and Acknowledged Mode (AM). The RLC 830 may execute transfer of upper layer protocol data units (PDUs), error correction through automatic repeat request (ARQ) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 or instance(s) of SDAP 847, or both, using one or more packet data convergence protocol service access points (PDCP-SAP) 845. These requests and indications communicated using PDCP-SAP 845 may include one or more radio bearers. The PDCP 840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, or integrity verification).

Instance(s) of SDAP 847 may process requests from and provide indications to one or more higher layer protocol entities using one or more SDAP-SAP 849. These requests and indications communicated using SDAP-SAP 849 may include one or more QoS flows. The SDAP 847 may map QoS flows to data radio bearers (DRBs), and vice versa, and may also mark QoS flow identifiers (QFIs) in DL and UL packets. A single SDAP entity 847 may be configured for an individual PDU session. In the UL direction, the NG-RAN 110 may control the mapping of QoS Flows to DRB(s) in two different ways, reflective mapping or explicit mapping. For reflective mapping, the SDAP 847 of a UE 101 may monitor the QFIs of the DL packets for each DRB, and may apply the same mapping for packets flowing in the UL direction. For a DRB, the SDAP 847 of the UE 101 may map the UL packets belonging to the QoS flows(s) corresponding to the QoS flow ID(s) and PDU session observed in the DL packets for that DRB. To enable reflective mapping, the NG-RAN 310 may mark DL packets over the Uu interface with a QoS flow ID. The explicit mapping may involve the RRC 855 configuring the SDAP 847 with an explicit QoS flow to DRB mapping rule, which may be stored and followed by the SDAP 847. In some examples, the SDAP 847 may only be used in NR implementations and may not be used in LTE implementations.

The RRC 855 may configure, using one or more management service access points (M-SAP), aspects of one or more protocol layers, which may include one or more instances of PHY 810, MAC 820, RLC 830, PDCP 840 and SDAP 847. In some examples, an instance of RRC 855 may process requests from and provide indications to one or more NAS entities 857 using one or more RRC-SAPs 856. The main services and functions of the RRC 855 may include broadcast of system information (e.g., included in master information blocks (MIBs) or system information blocks (SIBS) related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBS may comprise one or more information elements, which may each comprise individual data fields or data structures.

The NAS 857 may form the highest stratum of the control plane between the UE 101 and the AMF 321. The NAS 857 may support the mobility of the UEs 101 and the session management procedures to establish and maintain IP connectivity between the UE 101 and a P-GW in LTE systems.

In some examples, one or more protocol entities of arrangement 800 may be implemented in UEs 101, RAN nodes 111, AMF 321 in NR implementations or MME 221 in LTE implementations, UPF 302 in NR implementations or S-GW 222 and P-GW 223 in LTE implementations, or the like to be used for control plane or user plane communications protocol stack between the aforementioned devices. In some examples, one or more protocol entities that may be implemented in one or more of UE 101, gNB 111, AMF 321, among others, may communicate with a respective peer protocol entity that may be implemented in or on another device using the services of respective lower layer protocol entities to perform such communication. In some examples, a gNB-CU of the gNB 111 may host the RRC 855, SDAP 847, and PDCP 840 of the gNB that controls the operation of one or more gNB-DUs, and the gNB-DUs of the gNB 111 may each host the RLC 830, MAC 820, and PHY 810 of the gNB 111.

In some examples, a control plane protocol stack may include, in order from highest layer to lowest layer, NAS 857, RRC 855, PDCP 840, RLC 830, MAC 820, and PHY 810. In this example, upper layers 860 may be built on top of the NAS 857, which includes an IP layer 861, an SCTP 862, and an application layer signaling protocol (AP) 863.

In some examples, such as NR implementations, the AP 863 may be an NG application protocol layer (NGAP or NG-AP) 863 for the NG interface 113 defined between the NG-RAN node 111 and the AMF 321, or the AP 863 may be an Xn application protocol layer (XnAP or Xn-AP) 863 for the Xn interface 112 that is defined between two or more RAN nodes 111.

The NG-AP 863 may support the functions of the NG interface 113 and may comprise elementary procedures (EPs). An NG-AP EP may be a unit of interaction between the NG-RAN node 111 and the AMF 321. The NG-AP 863 services may include two groups: UE-associated services (e.g., services related to a UE 101) and non-UE-associated services (e.g., services related to the whole NG interface instance between the NG-RAN node 111 and AMF 321). These services may include functions such as, but not limited to: a paging function for the sending of paging requests to NG-RAN nodes 111 involved in a particular paging area; a UE context management function for allowing the AMF 321 to establish, modify, or release a UE context in the AMF 321 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 321; a NAS node selection function for determining an association between the AMF 321 and the UE 101; NG interface management function(s) for setting up the NG interface and monitoring for errors over the NG interface; a warning message transmission function for providing means to transfer warning messages using NG interface or cancel ongoing broadcast of warning messages; a configuration transfer function for requesting and transferring of RAN configuration information (e.g., SON information or performance measurement (PM) data) between two RAN nodes 111 using CN 120, or combinations of them, among others.

The XnAP 863 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 210), such as handover preparation and cancellation procedures, SN Status Transfer procedures, UE context retrieval and UE context release procedures, RAN paging procedures, or dual connectivity related procedures, among others. The XnAP global procedures may comprise procedures that are not related to a specific UE 101, such as Xn interface setup and reset procedures, NG-RAN update procedures, or cell activation procedures, among others.

In LTE implementations, the AP 863 may be an S1 Application Protocol layer (S1-AP) 863 for the S1 interface 113 defined between an E-UTRAN node 111 and an MME, or the AP 863 may be an X2 application protocol layer (X2AP or X2-AP) 863 for the X2 interface 112 that is defined between two or more E-UTRAN nodes 111.

The S1 Application Protocol layer (S1-AP) 863 may support the functions of the S1 interface, and similar to the NG-AP discussed previously, the S1-AP may include S1-AP EPs. An S1-AP EP may be a unit of interaction between the E-UTRAN node 111 and an MME 221 within an LTE CN 120. The S1-AP 863 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 863 may support the functions of the X2 interface 112 and may include X2AP basic mobility procedures and X2AP global procedures. The X2AP basic mobility procedures may include procedures used to handle UE mobility within the E-UTRAN 120, such as handover preparation and cancellation procedures, SN Status Transfer procedures, UE context retrieval and UE context release procedures, RAN paging procedures, or dual connectivity related procedures, among others. The X2AP global procedures may comprise procedures that are not related to a specific UE 101, such as X2 interface setup and reset procedures, load indication procedures, error indication procedures, or cell activation procedures, among others.

The SCTP layer (alternatively referred to as the SCTP/IP layer) 862 may provide guaranteed delivery of application layer messages (e.g., NGAP or XnAP messages in NR implementations, or S1-AP or X2AP messages in LTE implementations). The SCTP 862 may ensure reliable delivery of signaling messages between the RAN node 111 and the AMF 321/MME 221 based in part on the IP protocol, supported by the IP 861. The Internet Protocol layer (IP) 861 may be used to perform packet addressing and routing functionality. In some implementations the IP layer 861 may use point-to-point transmission to deliver and convey PDUs. In this regard, the RAN node 111 may include L2 and L1 layer communication links (e.g., wired or wireless) with the MME/AMF to exchange information.

In some examples, a user plane protocol stack may include, in order from highest layer to lowest layer, SDAP 847, PDCP 840, RLC 830, MAC 820, and PHY 810. The user plane protocol stack may be used for communication between the UE 101, the RAN node 111, and UPF 302 in NR implementations or an S-GW 222 and P-GW 223 in LTE implementations. In this example, upper layers 851 may be built on top of the SDAP 847, and may include a user datagram protocol (UDP) and IP security layer (UDP/IP) 852, a General Packet Radio Service (GPRS) Tunneling Protocol for the user plane layer (GTP-U) 853, and a User Plane PDU layer (UP PDU) 863.

The transport network layer 854 (also referred to as a "transport layer") may be built on IP transport, and the GTP-U 853 may be used on top of the UDP/IP layer 852 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 111 and the S-GW 222 may utilize an S1-U interface to exchange user plane data using a protocol stack comprising an L1 layer (e.g., PHY 810), an L2 layer (e.g., MAC 820, RLC 830, PDCP 840, and/or SDAP 847), the UDP/IP layer 852, and the GTP-U 853. The S-GW 222 and the P-GW 223 may utilize an S5/S8a interface to exchange user plane data using a protocol stack comprising an L1 layer, an L2 layer, the UDP/IP layer 852, and the GTP-U 853. As discussed previously, NAS protocols may support the mobility of the UE 101 and the session management procedures to establish and maintain IP connectivity between the UE 101 and the P-GW 223.

Moreover, although not shown by FIG. 6, an application layer may be present above the AP 863 and/or the transport network layer 854. The application layer may be a layer in which a user of the UE 101, RAN node 111, or other network element interacts with software applications being executed, for example, by application circuitry 405 or application circuitry 505, respectively. The application layer may also provide one or more interfaces for software applications to interact with communications systems of the UE 101 or RAN node 111, such as the baseband circuitry 610. In some examples, the IP layer or the application layer, or both, may provide the same or similar functionality as layers 5-7, or portions thereof, of the Open Systems Interconnection (OSI) model (e.g., OSI Layer 7 the application layer, OSI Layer 6—the presentation layer, and OSI Layer 5—the session layer).

Figure 7:
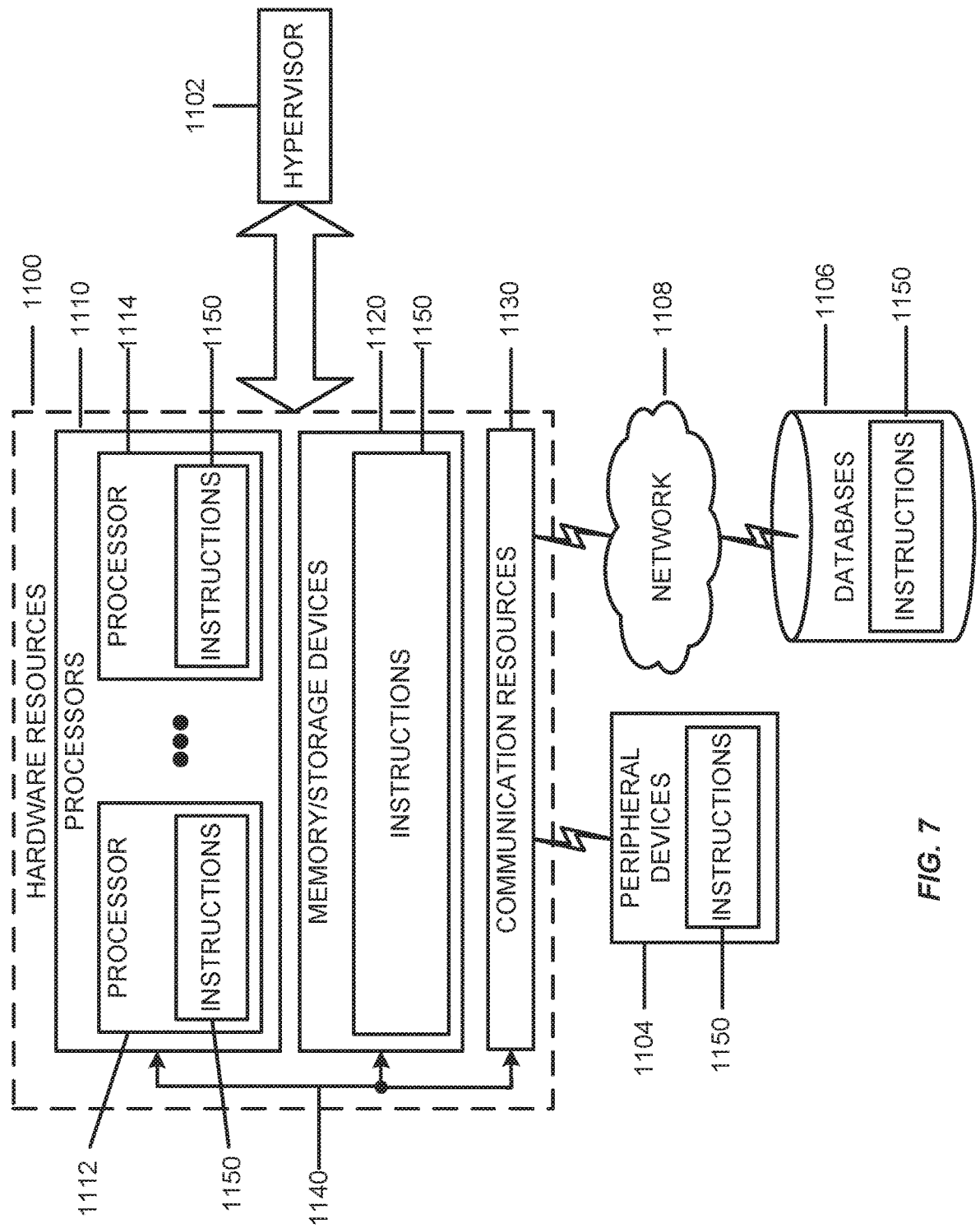
FIG. 7 illustrates a block diagram illustrating components, according to some example embodiments, able to read instructions from a machine-readable or computer-readable medium (e.g., a non-transitory machine-readable storage medium) and perform any one or more of the methodologies discussed herein.

FIG. 7 is a block diagram illustrating components for reading instructions from a machine-readable or computer-readable medium (e.g., a non-transitory machine-readable storage medium) and performing any one or more of the techniques described herein. Specifically, FIG. 7 shows a diagrammatic representation of hardware resources 1100 including one or more processors (or processor cores) 1110, one or more memory or storage devices 1120, and one or more communication resources 1130, each of which may be communicatively coupled using a bus 1140. For implementations where node virtualization (e.g., NFV) is utilized, a hypervisor 1102 may be executed to provide an execution environment for one or more network slices or sub-slices to utilize the hardware resources 1100.

The processors 1110 may include a processor 1112 and a processor 1114. The processor(s) 1110 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1120 may include main memory, disk storage, or any suitable combination thereof. The memory/storage devices 1120 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, or solid-state storage, or combinations of them, among others.

The communication resources 1130 may include interconnection or network interface components or other suitable devices to communicate with one or more peripheral devices 1104 or one or more databases 1106 using a network 1108. For example, the communication resources 1130 may include wired communication components (e.g., for coupling using USB), cellular communication components, NFC components, Bluetooth® (or Bluetooth® Low Energy) components, Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

Figure 8:
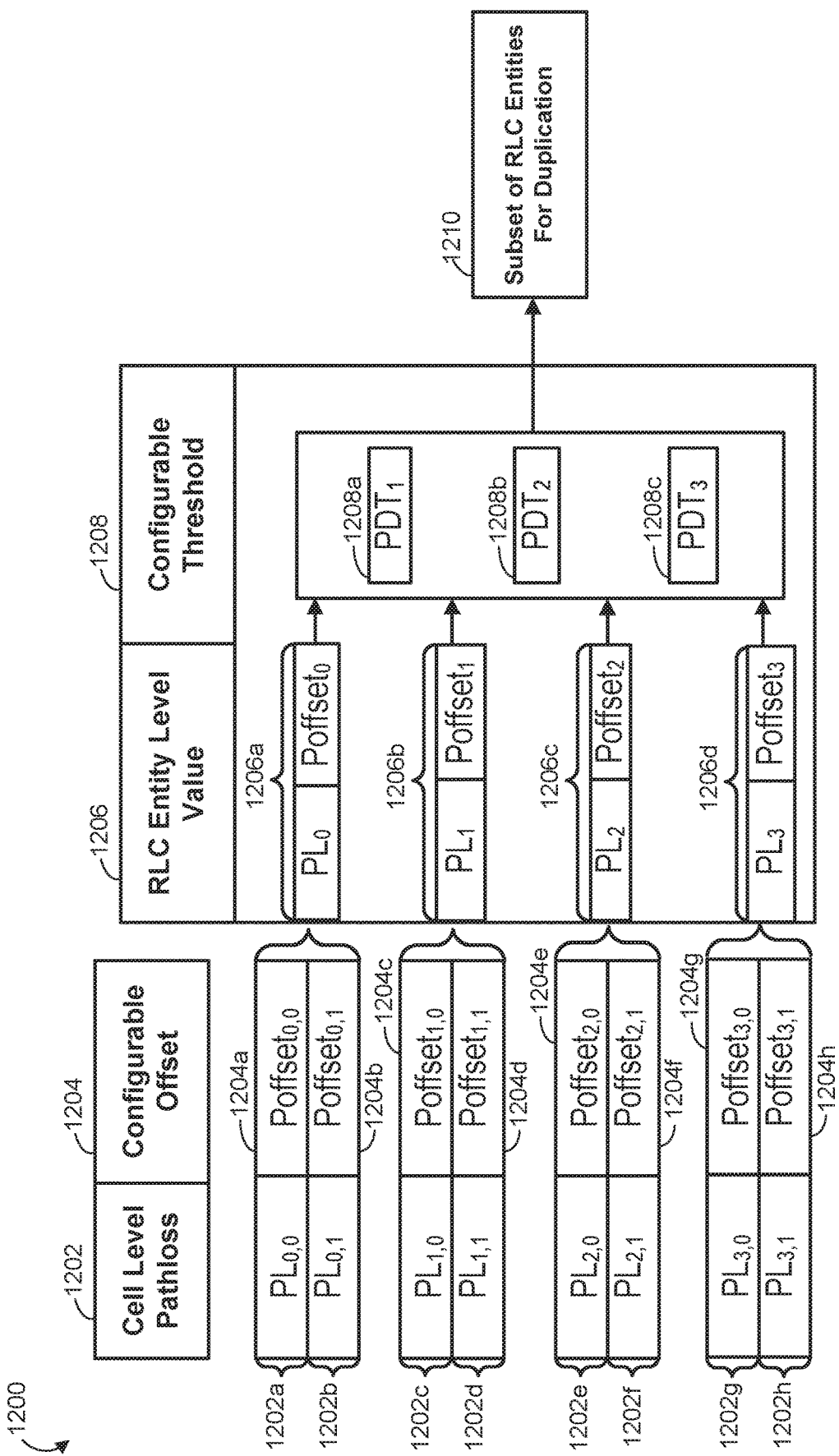
FIG. 8 illustrates an example procedure for selection of a subset of radio link control (RLC) entities for Packet Data Convergence Protocol (PDCP) packet duplication.

Turning to FIG. 8, an example embodiment of an environment 1200 for selection of a subset of RLC entities for PDCP duplication is shown. A UE (e.g., UE 101a-b of FIG. 1) can be configured to execute selection of a subset of RLC entities for PDCP duplication in an environment 1200. In some implementations, the autonomous selection of the subset of the RLC entities can be in response to detecting changes to radio conditions in an environment of the UE. The UE is configured to select a subset of RLC entities for PDCP duplication in order to reduce signaling overhead and resource overhead for communication among the UE and the RLC layer. Furthermore, the autonomous selection of RLC entities for PDCP duplication can be used to enable a Quality of Signal (QoS) requirement for Ultra-Reliable and Low Latency (URLLC) services.

For the environment 1200, the UE is configured to perform a measurement and select a subset of RLC entities for PDCP duplication based on at least one channel condition. For example, a pathloss metric is measured and represents the channel condition. Generally, the definition of pathloss is as shown in Equation (1):

$$PL_{f,c}(q_d) = \text{referenceSignalPower} - \text{higher layer filtered RSRP} \qquad (1)$$

Equation (1) is shown in 3GPP TS 38.213 version 15.4.0 Release 15 clause 7.1.1, published in April 2019. To reflect the uplink (UL) channel condition, a network-configured offset is included by the UE for each cell associated with a given RLC entity. In some implementations, a sum of a measured pathloss by the UE and a configurable offset generated by the UE represent the uplink signal-to-noise and interference ratio (SINR). Additionally, the UE configures threshold values for a data radio bearer (DRB) with PDCP duplication to select the subset of RLC entities. The threshold values represent threshold RLC entity level values (e.g., offset value+channel condition value) for determining how many RLC entities are selected for PDCP duplication.

Generally, a given RLC entity or set of RLC entities (e.g., each RLC entity) can be associated with a set of cells (e.g, cells associated with a gNB or base station). For example, for an RLC entity i, i=0, 1, 2, 3, is associated with a set of cells $c_{i,j}$, with j=0, 1, . . . n. For each cell $c_{i,j}$, the measured pathloss is shown as $PL_{i,j}$. Generally, the RRC configured offset is shown as $Poffset_{i,j}$. In an example, a UE can define a rule to derive an RLC entity level value $PL_i$ and $Poffset_i$ from the cell level measurements $PL_{i,j}$ and cell level offsets $Poffset_{i,j}$. If there is only one cell with uplink functionality in the RLC entity i, then $PL_i = PL_{i,0}$, $Poffset_i = Poffset_{i,0}$. If there are multiple cells with uplink functionality in the RLC entity, there are several options for selecting cells. For example, the UE can be configured to select the RLC entity including a cell with the overall smallest pathloss value and offset value. For example, the UE can select an RLC entity with an entity level value as shown in Equation (2).

$$\text{Entity level value} = PL_i + Poffset_i = \min_j \{PL_{i,j} + Poffset_{i,j}\}. \qquad (2)$$

Generally, as pathloss decreases in value for a channel, the channel quality for that channel increases. Thus, the minimum cell level value (or a group thereof, as subsequently described) is chosen to as the channel condition value for the RLC entity.

In some implementations, the LIE selects an RLC entity based on an average of the pathloss values and the offset values for the entire group of cells associated with that RLC entity (e.g., $PL_{i,j}+Poffset_{i,j}$). In some implementations, the UE can select an RLC entity based on average of a subset of cells associated with the RLC entity. Generally, a value is selected for a number of cells for averaging to represent the RLC entity. The cells of an RLC entity are ranked based on pathloss and offset values. An average is performed over the number of cells for the selected value for the highest-ranked cells.

In some implementations, the offset value for cells is configured per RLC entity, instead of per cell. In that case, pathloss $PL_i$ can be derived for each RLC entity. In some implementations, the options previously discussed can still be used to determine the selection of the RLC, in this case, including the best-cell pathloss and offset values, best group of cells pathloss and offset values, or entire group of cells average pathloss and offset values.

In environment 1200, cell level pathloss values 1202 are shown with configurable offset values 1204. In this example, there are four RLC entities. The RLC entities each include two cells. Each RLC entity is associated with a pathloss value 1202 for each cell. For example, a first RLC entity includes pathloss values 1202a and 1202b. A second RLC entity includes pathloss values 1202c and 1202d. A third RLC entity includes pathloss values 1202e and 1202f. A fourth RLC entity includes pathloss values 1202g and 1202h. Similarly, each RLC entity includes an offset value 1204 for each cell. For example, the first RLC entity includes offset values 1204a and 1204b. The second RLC entity includes offset values 1204c and 1204d. The third RLC entity includes offset values 1204e and 1204f. The fourth RLC entity includes offset values 1204g and 1204h.

Each of the pathloss values 1202 and offset values 1204 can be combined as previously described to represent RLC entity level values 1206. For example, the first RLC entity can include a first combined pathloss value and a first offset combined value to represent a first RLC entity level value 1206a. For example, the second RLC entity can include a second combined pathloss value and a second offset combined value to represent a second RLC entity level value 1206b. For example, the third RLC entity can include a third combined pathloss value and a third offset combined value to represent a third RLC entity level value 1206c. For example, the fourth RLC entity can include a fourth combined pathloss value and a fourth offset combined value to represent a fourth RLC entity level value 1206d.

For selection of a subset of the four RLC entities, configurable threshold values 1208 are applied to the RLC entity values 1206. In some implementations, multiple threshold values 1208 can be applied. For example, as shown in FIG. 8, a first threshold value 1208a ($PDT_1$), a second threshold value 1208b ($PDT_2$), and a third threshold value 1208c ($PDT_3$) are shown. These thresholds are applied in a staggered order to determine which of the RLC entities are to be selected for PDCP duplication, as subsequently described.

An example of a UE selecting a subset of RLC entities by applying the threshold values 1208 is now described. In this example, for each RLC entity i, i=0, 1, 2, 3, the pathloss value $PL_i$ and the offset value $Poffset_i$ are derived as previously described. The UE is configured to select a subset of RLC entities (e.g., of the first RLC entity, the second RLC entity, the third RLC entity, and the fourth RLC entity) in a unified manner. In this example, a radio resource control (RRC) entity configures three PDCP duplication threshold values 1208a, 120b, and 1208c, where $PDT_1<PDT_2<PDT_3$. The UE performs selection of a subset of RLC entities by applying the thresholds to the RLC entity level values 1206. For example, if at least one RLC entity level value is less than the first threshold value 1208a (e.g., $PL_i+Poffset_i<PDT_1$), the UE is configured to select the RLC entity with the lowest entity level value (e.g., $PL_j+Poffset_j$) for PDCP duplication, where the particular cell(s) of the entity are selected as previously described. If at least two RLC entity level values are less than the second threshold value 1208b (e.g., $PL_i+Poffset_i<PDT_2$), the UE is configured to select the two RLC entities with the lowest entity level values (e.g., $PL_j+Poffset_j$) for PDCP duplication. If at least three RLC entity level values are less than the third threshold vale 1208c (e.g., $PL_i+Poffset_i<PDT_3$), the UE selects the three RLC entities with the lowest entity level values (e.g., $PL_j+Poffset_j$) for PDCP duplication. If none of the previous scenarios apply, the UE selects all four RLC entities for PDCP duplication.

While four RLC entities are included in the previous example, the UE can apply the same approach when there are other numbers of RLC entities available, such as two, three, or more than four RLC entities configured by the RRC for PDCP duplication. For example, when there are two RLC entities configured by the RRC for PDCP duplication, the UE can select RLC entities as follows. If at least one RLC entity level value satisfies the first threshold value 1208a (e.g., $PL_i+Poffset_i<PDT_1$), the UE is configured to select the RLC entity having the lowest entity level value (e.g., $PL_j+Poffset_j$) for PDCP duplication. If no RLC entities as associated with entity level values that satisfy the threshold value 1208a, the UE selects both RLC entities for PDCP duplication.

In some implementations, the threshold values 1208 (e.g., $PDT_i$) can be configured to restrict a maximum number of RLC entities for PDCP duplication. For example, the number of RLC entities for PDCP duplication can be restricted to two (2) if a threshold value 1208b (e.g., $PDT_2$) is set to a large value relative to the entity level values 1206.

While pathloss is described in the above example as the channel metric for generating the RLC entity level values 1206, in some implementations, other channel metrics can be used by the UE for selection of RLC entity subsets for PDCP duplication. For example, 3GPP TS 38.215 version 15.4.0 Release 15, section 5.1 (published April 2019) defines a physical layer (L1) beam level measurement of synchronization signal/channel-state information reference signal (SS/CSI-RS), measurement of reference signal received power (L1-RSRP), measurement of reference signal received quality (L1-RSRQ), and measurement of physical layer SINR (L1-SINR). Each or any of these metrics, either individually or in any combination, can be used by the UE to approximate the channel condition for a given cell and/or RLC entity. For example, a physical layer measurement can be filtered in the network layer. For example, beam-level measurements can be aggregated into cell-level measurement. The UE uses these measurements to autonomously select the subset of RLC entities for PDCP duplication. In some implementations, for beam level measurements, the UE is configured to indicate the SS/CSI-RS for beam level RSRP, RSRQ, and/or SINR measurements for each cell of a given RLC entity. In some implementations, the UE can use a user power headroom as a channel condition metric for determination of the RCL entity level values 1206.

Generally, for any of the channel condition metrics including RSRP, RSRQ, SINR, or power headroom, a larger the value is indicative of an increased channel quality. This is different from the pathloss channel condition metric previously described. For example, to derive an RLC entity level value 1206 $RSRP_i$ and $Poffset_i$ from the cell level measurements $RSRP_{i,j}$ and $Poffset_{i,j}$, the UE uses different logic than previously described. For example, to select the best cell in pathloss approach becomes as shown in Equation (3).

$$\text{Entity level value} = RSRP_i + Poffset_i = \max_j \{RSRP_{i,j} + Poffset_{i,j}\}. \quad (3)$$

When the UE applies Equation 3, the UE uses a maximum value to select a cell level value (or group of cell level values, as previously described) to represent the RLC entity level value. The process by which the UE selects the RLC entity is adjusted from the previously described process.

The UE is configured to select a subset of RLC entities in a unified manner. For example, for each RLC entity i, i=0, 1, 2, 3 (e.g., of a group of four RLC entities), values for $RSRP_i$ and $Poffset_i$ are determined as previously described. In this example, an RRC configures three PDCP duplication thresholds $PDT_1>PDT_2>PDT_3$. The UE is configured to select a subset of RLC entities can be done based on the following approach. If at least one RLC entity level value is greater than the first threshold value (e.g., $RSRP_i+Poffset_i>PDT_1$), the UE selects the RLC entity with the largest cell level value ($RSRP_j+Poffset_j$) for PDCP duplication. If at least two RLC entity values are greater than the second threshold value (e.g., $RSRP_i+Poffset_i>PDT_2$), the UE selects the two RLC entities associated with the largest cell level values (e.g., $RSRP_j+Poffset_j$) for PDCP duplication. If at least three RLC entity level values are greater than the third threshold value (e.g., $RSRP_i+Poffset_i>PDT_3$), the UE selects the three RLC entities with the largest cell level values ($RSRP_j+Poffset_j$) for PDCP duplication. If none of the above scenarios apply, the UE selects all four RLC entities for PDCP duplication. In other words, the selected subset of RCL entities is used for PDCP duplication for the UE.

This approach can be extended for environments having two, three, or more than four RLC entities configured by the RRC for PDCP duplication. The threshold values (e.g., $PDT_i$) can be adjusted to restrict the number of RLC entities for PDCP duplication. For example, a maximum number of RLC entities for PDCP duplication can be restricted to two if the value of $PDT_2$ is set to a relatively small value with respect to the entity level values.

Generally, the UE-based activation and/or deactivation of RLC entities for PDCP duplication is configured in RRC signaling. In some implementations, the configuration can be per data radio bearer (DRB), per UE, or per cell group. In other words, the selected subset of RCL entities is used for PDCP duplication for the UE.

The relationship between a process of a medium access control (MAC) control element (CE) based activation and/or deactivation of RLC entities for PDCP duplication and a process of a UE-based activation and/or deactivation of RLC entities for PDCP duplication is now described. Generally, a system can use a MAC CE (also called a MAC CE structure) to select a subset of RLC entities for PDCP duplication in a manner similar to that described in 3GPP TS 38.321 version 15.3.0 Release 15 section 6.1.3.8, published in October 2018. UE-based activation and/or deactivation of RLC entities for PDCP duplication is a complementary mechanism to MAC CE based activation and/or deactivation of RLC entities for PDCP duplication.

Generally, when UE-based activation and/or deactivation of RLC entities for PDCP duplication is configured, a gNB can use MAC CE to fine-tune which RLC entities and/or which cells of the RLC entities are included the subset of RLC entities for PDCP duplication. To avoid UE-based approaches causing an override of a decision by approaches of the MAC CE, the UE-based approach for activation and/or deactivation of RLC entities for PDCP duplication can be disabled for a duration after a MAC CE structure is used to adjust the subset of RLC entities of a DRB.

The duration for which the UE-based approach is disabled can be predefined, dynamic, etc. as needed. For example, a timer can be started after UE receives a MAC CE for PDCP duplication activation and/or deactivation. In some implementations, the timer length can be configured per UE, per MAC entity, or per DRB. In some implementations, the timer length can be configured by RRC signaling. In some implementations, if the timer length is configured per UE or per MAC entity, the timer can be either MAC entity specific or DRB specific. In some implementations, if the timer length is configured per DRB, the timer is then DRB specific.

The timer is adjusted depending on whether the timer is MAC-entity specific or DRB specific. For example, when the timer is MAC-entity specific, after the MAC entity receives a MAC CE for PDCP duplication activation and/or deactivation, the timer is started. UE-based PDCP duplication activation and/or deactivation for all DRBs associated with the MAC entity is disabled until the timer expires. In another example, when the timer is DRB specific, the DRB specific timer is only started after receiving a MAC CE structure that adjusts the subset of RLC entities for the DRB (and potentially other DRBs). The UE-based PDCP duplication activation and/or deactivation for the DRB is then disabled until the timer expires.

Figure 9:
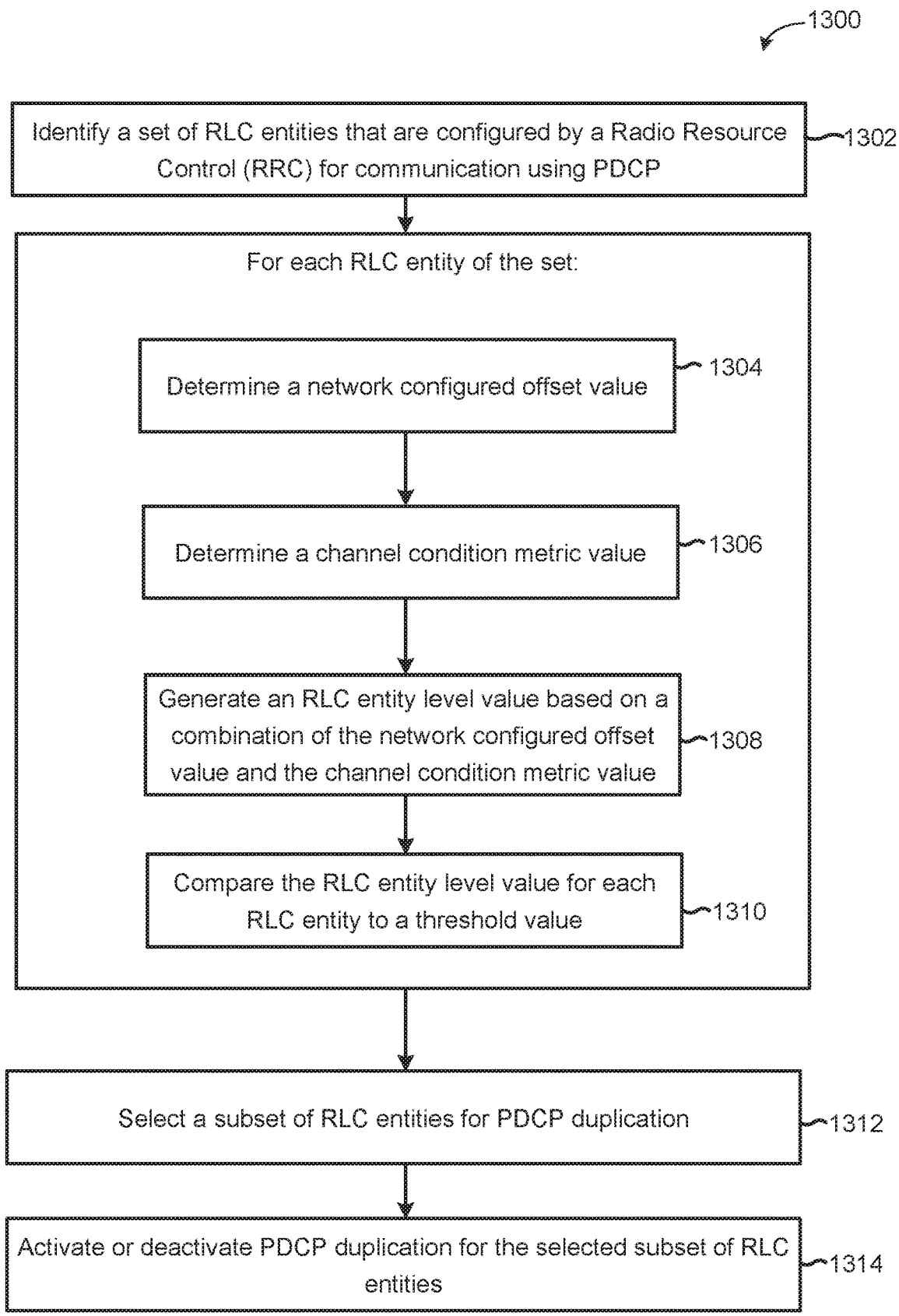
FIG. 9 illustrates an example process for UE-based PDCP duplication activation and/or deactivation.

Turning to FIG. 9, a flow diagram shows a process 1300 for UE-based PDCP duplication activation and/or deactivation. The process 1300 can be executed by a UE, such as the UEs 101*a-b* described above in relation to FIG. 1. The UE is configured to select a subset of RLC entities that are configured by an RRC. The UE is configured to select the subset of RLC entities for PDCP duplication. More specifically, the UE is configured for activation or deactivation of a RLC entity for PDCP duplication. The UE is configured to identify (1302) a set of RLC entities that are configured by a Radio Resource Control (RRC) for communication using PDCP. For each RLC entity of the set of RLC entities, the UE is configured to determine (1304) a network configured offset value. For example, the offset value can include a cell level offset values for the RLC entity (or combination of cell level offset values, as previously described). The UE is configured to determine (1306) a channel condition value. As previously described in relation to FIG. 8, the channel condition value can be based on a cell level channel condition value or a combination of cell level channel condition values for at least two cells of the RLC entity.

The UE is configured to generate (1308), for each RLC entity, an RLC entity level value based on a combination of the network configured offset value and the channel condition value. In some implementations, the channel condition value can represent a pathloss value. In this case, cells associated with the smallest pathloss values for an RLC entity can be selected for generation of the RLC entity value for that RLC entity. In some implementations, the channel condition value can represent one or more of a synchronization signal/channel-state information reference signal (SS/CSI-RS) value, a reference signal received power (RSRP) value, a reference signal received quality (RSRQ) value, a signal to noise and interference ratio SINR value, and a power headroom value. In these examples, for an RLC entity, cells associated with the largest channel condition values for an RLC entity can be selected for generation of the RLC entity value for that RLC entity. As previously described, the RLC entity value can include a combination of the offset value and the channel condition value for an RLC entity. In some implementations, the RLC entity value represents an average of the cell level values for the RLC entity, either for all cells or for a subset of the cells. For example, each cell's offset value and channel condition value can be combined, and the results for each cell can be averaged to represent the RLC entity value. In some implementations, only results from the best cells (e.g., the cells with the lowest pathloss values or highest RSRP, SS/CSI-RS, RSRQ, power headroom etc.) can be selected for including in the RLC entity level value.

The UE is configured to compare (1310) the RLC entity level value for each RLC entity to a threshold value. As previously described, the threshold value can be predetermined and calibrated so that a desired number of RLC entities are selected for PDCP duplication for given channel conditions. For example, multiple threshold values can be set, and each RLC entity value can be compared to each threshold value.

Based on comparing the RLC entity level value to the threshold value(s), the UE is configured to select (1312) a subset of RLC entities for PDCP duplication. As stated above in relation to FIG. 8, the RLC entity level values are compared to the one or more threshold values, and a number of RLC entities are selected for PDCP duplication depending on the number of entities that satisfy each threshold. For example, the RLC entity level values are compared to a first threshold value. If an RLC entity level value satisfies this threshold value, one RLC entity is selected for PDCP duplication. If no RLC entity level value satisfies this threshold value, the RLC entity level values are compared to the second threshold value (which may be higher or lower in value, depending on the channel condition metric being used). If at least two RLC entities satisfy the second threshold, then two RLC entities are selected for PDCP duplication. The number of threshold values set can be changed depending on the number of RLC entities available in the set for PDCP duplication.

The UE is configured to activate or deactivate (1314) PDCP duplication for the selected subset of RLC entities. In some implementations, the HE causes a duplicated transmission using the subset of RLC entities that are selected.

As previously stated, when a MAC CE is used for controlling PDCP duplication, UE control can be based on a timer so that the UE does not override the MAC CE. For example, the UE can be configured to receive a MAC CE indicating a selection of a particular subset of RLC entities for PDCP duplication. The UE is configured to initiate a timer having a duration. The UE is configured to pause or disable selection of the subset of RLC entities for PDCP duplication until the duration expires. In some implementations, the duration of the timer is specific to the UE, specific to a MAC entity that generates the MAC CE, or specific to a data radio bearer (DRB) associated with the MAC entity.

As previously stated, variations on process 1300 are possible. For example, determining the channel condition value can include measuring, by the UE, one or more values selected from a pathloss value, a synchronization signal/channel-state information reference signal (SS/CSI-RS) value, a reference signal received power (RSRP) value, a reference signal received quality (RSRQ) value, a signal to noise and interference ratio SINR value, and a power headroom value.

In some implementations, determining the channel condition value includes aggregating cell-level measurements for the RLC entity, such as taking two or more best cells for the RLC entity representing the best channel conditions (such as highest RSRP, SS/CSI-RS, RSRQ, power headroom, SINR, etc. or a lowest pathloss value). The cell level values of the best cells can be averaged. In some implementations, another function can be applied to the cell level values for combining them, such as a weighted average or any other such function. For example, when one or more of the RLC entities includes a set of cells, the UE can be configured to generate the RLC entity level value for the RLC entity by determining, for each cell of the set of cells for the RLC entity, a cell level channel condition value and a cell level offset value. The UE selects one or more cells from the set of cells. The UE generates the RLC entity level value as a function of the cell level channel condition value and the cell level offset value for each cell of the one or more cells. Selecting one or more cells from the set of cells can include selecting the cell including a cell level channel condition value representing a lowest pathloss value relative to pathloss values associated with other cells of the set of cells. For example, generating the RLC entity level value as a function of the cell level channel condition value and the cell level offset value for each cell of the one or more cells can include averaging the cell level channel condition value and the cell level offset value for the one or more cells.

In some implementations, the UE is configured to determine that at least one RLC entity of the set of RLC entities is associated with an RLC entity level value satisfies the threshold value. Selecting the subset of RLC entities for PDCP duplication by the UE includes selecting a particular RLC entity associated with a smallest RLC entity level value relative to other RLC entity level values of the set of RLC entities or associated with a largest RLC entity level value relative to the other RLC entity level values of the set of RLC entities.

In some implementations, the threshold value is a first threshold value, and the UE is configured, based on comparing the RLC entity level value for each RLC entity to the first threshold value, to determine that none of the RLC entities are associated with RLC entity value that satisfies the first threshold value. The UE compares the RLC entity level value for each RLC entity to a second threshold value. The UE determines that at least two RLC entities are associated with respective RLC entity values that satisfy the second threshold value. Selecting the subset of RLC entities for PDCP duplication can include selecting two RLC entities associated with smallest respective RLC entity values relative to other RLC entity level values of the set of RLC entities or selecting two RLC entities associated with largest respective RLC entity values relative to the other RLC entity level values of the set of RLC entities.

In some implementations, the UE does not perform the selection of the RLC entities, but rather another communication entity in a wireless communication system can perform these actions. The communication entity includes circuitry to select a subset of RLC entities for PDCP duplication based on the configured criteria and the radio channel condition. This entity can select RLC entities based on a radio channel condition of pathloss. The communication entity can select RLC entities based on pathloss, configurable offsets and predetermined threshold values. In some implementations, the RLC entity level value pathloss and offset are derived from the cell level pathloss and cell level offsets. In some implementations, the radio channel condition includes RSRP. In some implementations, the selection is disabled for a duration after MAC CE adjusts the subset of RLC entities of a DRB.

In a general aspect, the communication entity is configured to select a subset of RLC entities for PDCP duplication based on a configured criteria and a radio channel condition. For example, a UE can perform the selection. In some implementations, the radio channel condition is pathloss. The UE can select RLC entities based on a radio channel condition of pathloss. The communication entity can select RLC entities based on pathloss, configurable offsets and predetermined threshold values. In some implementations, the RLC entity level value pathloss and offset are derived from the cell level pathloss and cell level offsets. In some implementations, the radio channel condition includes RSRP. In some implementations, the selection is disabled for a duration after MAC CE adjusts the subset of RLC entities of a DRB.

In some examples, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. In some examples, circuitry associated with a UE, base station, network element, or other component described above in connection with one or more of the preceding figures may be configured to operate in accordance with one or more of the examples set forth below in the example section.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods described here may be implemented in software, hardware, or a combination thereof, in different implementations. In addition, the order of the blocks of the methods may be changed, and various elements may be added, reordered, combined, omitted, modified, and the like. Various modifications and changes may be made as would be obvious to a person skilled in the art having the benefit of this disclosure. The various implementations described here are meant to be illustrative and not limiting. Many variations, modifications, additions, and improvements are possible. Accordingly, plural instances may be provided for components described here as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component.

The following terms and definitions may be applicable to the examples described herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/DC.

The term "Special Cell" refers to the PCell of the MCG or the PSCell of the SCG for DC operation; otherwise, the term "Special Cell" refers to the Pcell.

What is claimed is:

1. A method comprising:
   identifying a set of Radio Link Control (RLC) entities that are configured by a Radio Resource Control (RRC) for communication using Packet Data Convergence Protocol (PDCP);
   for each RLC entity of the set of RLC entities:
      determining a channel condition value; and
      determining an RLC entity level value based on a combination of an offset value and the channel condition value;
   comparing the respective RLC entity level value for each RLC entity to a threshold value;
   based on comparing the respective RLC entity level value to the threshold value, selecting a subset of the set of RLC entities for PDCP duplication;
   activating or deactivating the PDCP duplication by the selected subset of RLC entities;
   receiving a medium access control (MAC) control element (CE) indicating a selection of a particular subset of RLC entities for PDCP duplication;
   initiating a timer having a duration; and
   pausing selection of the subset of RLC entities for PDCP duplication until the duration expires.

2. The method of claim 1, further comprising causing a duplicated transmission using the subset of RLC entities that are selected.

3. The method of claim 1, wherein determining the channel condition value comprises measuring one or more values selected from:
   a pathloss value, a synchronization signal/channel-state information reference signal (SS/CSI-RS) value, a reference signal received power (RSRP) value, a reference signal received quality (RSRQ) value, a signal to noise and interference ratio SINR value, and a power headroom value.

4. The method of claim 1, wherein determining the channel condition value comprises averaging cell-level measurements associated with the RLC entity.

5. The method of claim 1, wherein each RLC entity includes a set of cells, and wherein determining the RLC entity level value for the RLC entity comprises:
   determining, for each cell of the set of cells for the RLC entity, a cell level channel condition value and a cell level offset value;
   selecting one or more cells from the set of cells; and
   determining the RLC entity level value as a function of the cell level channel condition value and the cell level offset value for each cell of the one or more cells, wherein the cell level offset value is the offset value.

6. The method of claim 5, wherein selecting one or more cells from the set of cells comprises selecting the cell including a cell level channel condition value representing a lowest pathloss value relative to pathloss values associated with other cells of the set of cells.

7. The method of claim 5, wherein determining the RLC entity level value as a function of the cell level channel condition value and the cell level offset value for each cell of the one or more cells comprises averaging the cell level channel condition value and the cell level offset value for the one or more cells.

8. The method of claim 1, further comprising:
   determining that at least one RLC entity of the set of RLC entities is associated with an RLC entity level value satisfies the threshold value,
   wherein selecting the subset of RLC entities for PDCP duplication comprises selecting a particular RLC entity associated with a smallest RLC entity level value relative to other RLC entity level values of the set of RLC entities or associated with a largest RLC entity level value relative to the other RLC entity level values of the set of RLC entities.

9. The method of claim 1, wherein the threshold value is a first threshold value, the method further comprising:
   based on comparing the RLC entity level value for each RLC entity to the first threshold value, determining that none of the RLC entities are associated with RLC entity value that satisfies the first threshold value;
   comparing the RLC entity level value for each RLC entity to a second threshold value; and
   determining that at least two RLC entities are associated with respective RLC entity values that satisfy the second threshold value,
   wherein selecting the subset of RLC entities for PDCP duplication comprises selecting two RLC entities associated with smallest respective RLC entity values relative to other RLC entity level values of the set of RLC entities or selecting two RLC entities associated with largest respective RLC entity values relative to the other RLC entity level values of the set of RLC entities.

10. The method of claim 1, wherein the duration of the timer is specific to a user equipment (UE), specific to a MAC entity that generates the MAC CE, or specific to a data radio bearer (DRB) associated with the MAC entity.

11. An apparatus comprising: at least one processing device; and a memory storing instructions that, when executed by the at least one processing device, causing the at least one processing device to perform operations comprising:
    identifying a set of RLC entities that are configured by a Radio Resource Control (RRC) for communication using PDCP; for each RLC entity of the set of RLC entities:
    determining a channel condition value; and
    determining an RLC entity level value based on a combination of an offset value and the channel condition value;
    comparing the RLC respective entity level values for each RLC entity to a threshold value;
    based on comparing the respective RLC entity level values to the threshold value, selecting a subset of the set of RLC entities for PDCP duplication;
    activating or deactivating the PDCP duplication by the selected subset of RLC entities;
    receiving a medium access control (MAC) control element (CE) indicating a selection of a particular subset of RLC entities for PDCP duplication;
    initiating a timer having a duration; and
    pausing selection of the subset of RLC entities for PDCP duplication until the duration expires.

12. The apparatus of claim 11, wherein the operations further comprise causing a duplicated transmission using the subset of RLC entities that are selected.

13. The apparatus of claim 11, wherein determining the channel condition value comprises measuring one or more values selected from: a pathloss value, a synchronization signal/channel-state information reference signal (SS/CSI-RS) value, a reference signal received power (RSRP) value, a reference signal received quality (RSRQ) value, a signal to noise and interference ratio SINR value, and a power headroom value.

14. The apparatus of claim 11, wherein determining the channel condition value comprises averaging cell-level measurements for the RLC entity.

15. The apparatus of claim 11, wherein each RLC entity includes a set of cells, and wherein determining the RLC entity level value for the RLC entity comprises: determining, for each cell of the set of cells for the RLC entity, a cell level channel condition value and a cell level offset value; selecting one or more cells from the set of cells; and determining the RLC entity level value as a function of the cell level channel condition value and the cell level offset value for each cell of the one or more cells, wherein the cell level offset value is the offset value.

16. The apparatus of claim 15, wherein determining the RLC entity level value as a function of the cell level channel condition value and the cell level offset value for each cell of the one or more cells comprises averaging the cell level channel condition value and the cell level offset value for the one or more cells.

17. The apparatus of claim 11, wherein the operations further comprise: determining that at least one RLC entity of the set of RLC entities is associated with an RLC entity level value satisfies the threshold value, wherein selecting the subset of RLC entities for PDCP duplication comprises selecting a particular RLC entity associated with a smallest RLC entity level value relative to other RLC entity level values of the set of RLC entities or associated with a largest RLC entity level value relative to the other RLC entity level values of the set of RLC entities.

18. The apparatus of claim 11, wherein the duration of the timer is specific to a user equipment (UE), specific to a MAC entity that generates the MAC CE, or specific to a data radio bearer (DRB) associated with the MAC entity.

19. One or more processors coupled to a memory storing instructions for causing the one or more processors, when executing the instructions, to perform operations comprising:

identifying a set of RLC entities that are configured by a Radio Resource Control (RRC) for communication using Packet Data Convergence Protocol (PDCP);

for each RLC entity of the set of RLC entities:
  determining a channel condition value; and
  determining an RLC entity level value based on a combination of an offset value and the channel condition value;

comparing the RLC respective entity level values for each RLC entity to a threshold value;

based on comparing the respective RLC entity level values to the threshold value, selecting a subset of the set of RLC entities for PDCP duplication;

activating or deactivating the PDCP duplication by the selected subset of RLC entities;

receiving a medium access control (MAC) control element (CE) indicating a selection of a particular subset of RLC entities for PDCP duplication;

initiating a timer having a duration; and pausing selection of the subset of RLC entities for PDCP duplication until the duration expires.

* * * * *